(12) United States Patent
Chang et al.

(10) Patent No.: US 12,253,533 B2
(45) Date of Patent: Mar. 18, 2025

(54) METHODS AND APPARATUS PROVIDING CALIBRATION OF BACKGROUND ILLUMINATION FOR SAMPLE AND/OR SAMPLE CONTAINER CHARACTERIZATION

(71) Applicant: Siemens Healthcare Diagnostics Inc., Tarrytown, NY (US)

(72) Inventors: Yao-Jen Chang, Princeton, NJ (US); Patrick Wissmann, Munich (DE); Ludwig Listl, Munich (DE); Benjamin S. Pollack, Jersey City, NJ (US); Ramkrishna Jangale, Pune (IN); Rayal Raj Prasad Nalam Venkat, Princeton, NJ (US); Venkatesh NarasimhaMurthy, Hillsborough, NJ (US); Ankur Kapoor, Plainsboro, NJ (US)

(73) Assignee: Siemens Healthcare Diagnostics Inc., Tarrytown, NY (US)

(*) Notice: Subject to any disclaimer, the term of this patent is extended or adjusted under 35 U.S.C. 154(b) by 0 days.

(21) Appl. No.: 17/755,461

(22) PCT Filed: Oct. 22, 2020

(86) PCT No.: PCT/US2020/056914
§ 371 (c)(1),
(2) Date: Apr. 29, 2022

(87) PCT Pub. No.: WO2021/086718
PCT Pub. Date: May 6, 2021

(65) Prior Publication Data
US 2024/0159786 A1    May 16, 2024

Related U.S. Application Data

(60) Provisional application No. 62/929,058, filed on Oct. 31, 2019.

(51) Int. Cl.
*G01N 35/00* (2006.01)
*G01N 35/04* (2006.01)
(Continued)

(52) U.S. Cl.
CPC .. *G01N 35/00693* (2013.01); *G01N 35/00663* (2013.01); *G01N 2035/0406* (2013.01); *G06V 10/141* (2022.01); *G06V 10/56* (2022.01)

(58) Field of Classification Search
None
See application file for complete search history.

(56) References Cited

U.S. PATENT DOCUMENTS 7,628,507 B2    12/2009    Allen et al.
10,451,541 B2   10/2019   Collins et al.
(Continued)

FOREIGN PATENT DOCUMENTS

CN    103608661 A    2/2014
CN    102890423 B    7/2015
(Continued)

OTHER PUBLICATIONS

Extended EP Search Report dated Mar. 17, 2023 of corresponding European Application No. 20880712.3, 6 Pages.
(Continued)

*Primary Examiner* — Suman K Nath
*Assistant Examiner* — Nigel H Plumb

(57) ABSTRACT

A calibration method is provided including identifying the imaging area on each light panel with respect to each imaging device. A center position of the imaging area of each light panel for each imaging device is determined. An optimal optical center of the imaging apparatus using the center position of the imaging area of each imaging device is determined. A tube calibration tool is installed in a carrier on a track, and the carrier is moved on the track so that a
(Continued)

center of the tube calibration tool is located at a closest location to the optimal optical center of the imaging apparatus. The center of the tube calibration tool is used to determine a center of a region of interest (ROI) for backlight calibration. Methods for health checking the calibration and apparatus used to carry out the calibration are provided as well as other aspects.

20 Claims, 14 Drawing Sheets

(51) Int. Cl.
  *G06V 10/141* (2022.01)
  *G06V 10/56* (2022.01)

(56) References Cited

U.S. PATENT DOCUMENTS

| | | | |
|---|---|---|---|
| 10,746,753 B2* | 8/2020 | Kluckner | G06T 7/11 |
| 2005/0270776 A1 | 12/2005 | Allen et al. | |
| 2010/0201809 A1* | 8/2010 | Oyama | G01C 25/00 348/188 |
| 2014/0028857 A1 | 1/2014 | Jasperse | |
| 2016/0334403 A1* | 11/2016 | Gibbons | B01L 3/0275 |
| 2017/0124704 A1 | 5/2017 | Wu et al. | |
| 2017/0236281 A1* | 8/2017 | Dacosta | A61B 5/0071 382/128 |
| 2018/0209912 A1* | 7/2018 | Yang | G01N 33/32 |
| 2018/0365530 A1 | 12/2018 | Kluckner et al. | |
| 2018/0372648 A1* | 12/2018 | Wissmann | G01N 35/00663 |
| 2019/0041318 A1 | 2/2019 | Wissmann et al. | |
| 2019/0271714 A1 | 9/2019 | Kluckner et al. | |
| 2021/0164965 A1 | 6/2021 | Ma et al. | |

FOREIGN PATENT DOCUMENTS

| | | | |
|---|---|---|---|
| CN | 105352969 | A | 2/2016 |
| CN | 108770364 | A | 11/2018 |
| JP | 2004093972 | A | 3/2004 |
| JP | 2008145316 | A | 6/2008 |
| JP | 2012-042229 | A | 3/2012 |
| JP | 2012150083 | A | 8/2012 |
| JP | 2013079833 | A | 5/2013 |
| JP | 2014-517271 | A | 7/2014 |
| JP | 2016-212097 | A | 12/2016 |
| JP | 2019-505802 | A | 2/2019 |
| JP | 2019-510963 | A | 4/2019 |
| KR | 20130022415 | A | 3/2013 |
| WO | 2012151358 | A2 | 11/2012 |
| WO | 2013134491 | A1 | 9/2013 |
| WO | 2018022280 | A1 | 2/2018 |
| WO | 2018/089935 | A1 | 5/2018 |
| WO | 2019/018313 | A1 | 1/2019 |
| WO | 2019/023376 | A1 | 1/2019 |

OTHER PUBLICATIONS

PCT International Search Report and Written Opinion dated Feb. 19, 2021 (10 Pages).

Lee et al., "A camera-based color calibration of tiled display systems under various illumination environments", Journal of Information Display, Mar. 13, 2017, retrieved on [Jan. 26, 2021]. Retrieved from the internet <URL: https://www.tandfonline.com/doi/pdf/10.1080/15980316.2017.1291454> entire document.

Extended EP Search Report dated Nov. 24, 2022 of corresponding European Application No. 20880712.3, 6 Pages.

* cited by examiner

FIG. 5H
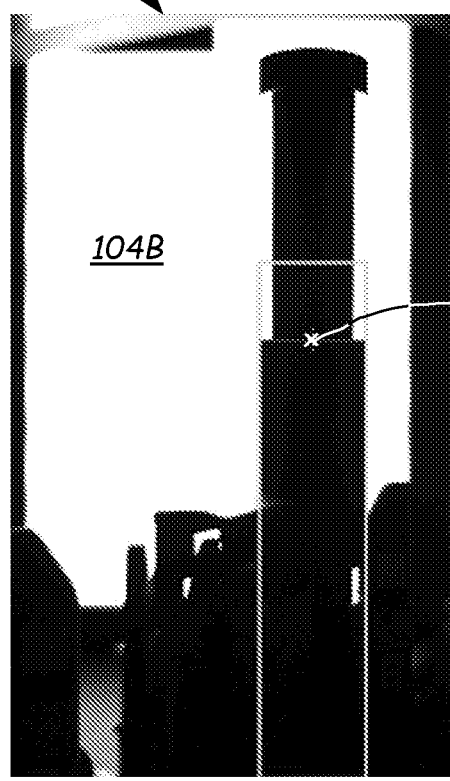
FIG. 5I
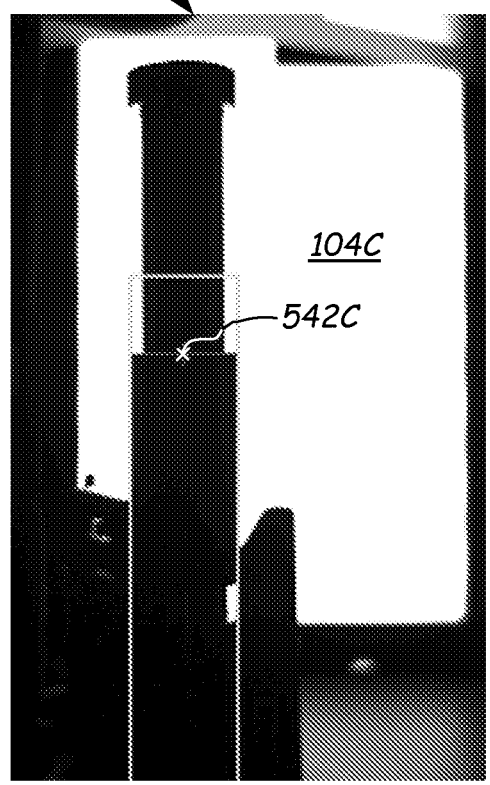
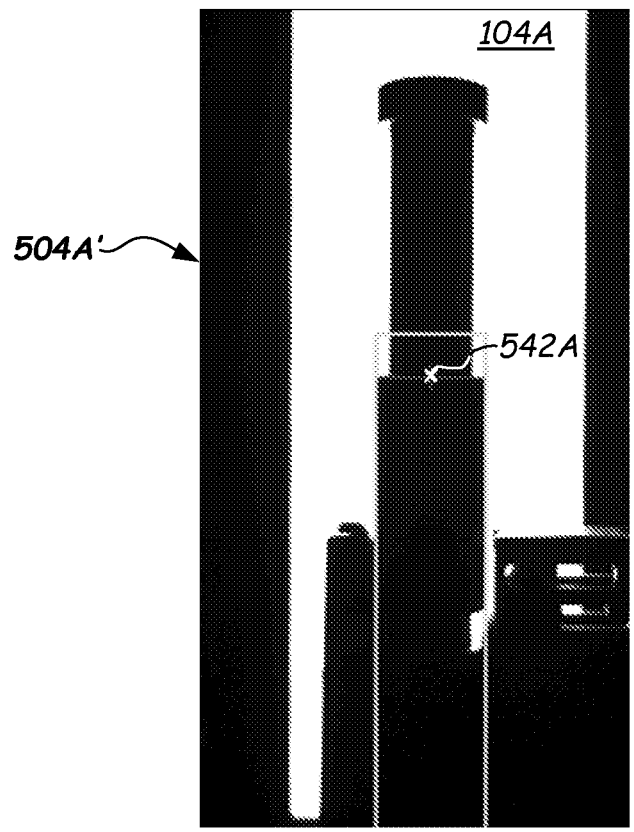
FIG. 5J

METHODS AND APPARATUS PROVIDING CALIBRATION OF BACKGROUND ILLUMINATION FOR SAMPLE AND/OR SAMPLE CONTAINER CHARACTERIZATION

CROSS REFERENCE TO RELATED APPLICATION

This disclosure claims the benefit of U.S. Provisional Patent Application No. 62/929,058, entitled "METHODS AND APPARATUS PROVIDING CALIBRATION OF BACKGROUND ILLUMINATION FOR SAMPLE AND/OR SAMPLE CONTAINER CHARACTERIZATION" filed Oct. 31, 2019, the disclosure of which is hereby incorporated by reference in its entirety for all purposes.

FIELD

The present disclosure relates to imaging methods and imaging apparatus adapted to image a sample tube (specimen container), and more particularly to methods and apparatus for calibrating an imaging apparatus.

BACKGROUND

Automated testing systems may conduct clinical chemistry or assays using one or more reagents and/or other materials to identify an analyte or other constituent in a biological sample such as blood serum, blood plasma, urine, interstitial liquid, cerebrospinal liquids, and the like. For convenience and safety reasons, these samples are almost always contained in sample tubes (e.g., blood collection tubes). Each sample tube may be capped with a cap and in some cases, the caps may include a cap color and/or cap type that can provide information concerning the type of test to be conducted thereon, type of additive contained in the tube (e.g., serum separator, coagulant such as thrombin, or anticoagulant and specific type thereof, like EDTA, $K_2$EDTA, or sodium citrate, and/or anti-glycosis additive), whether the tube is provided with vacuum capability, and the like.

Improvements in automated testing have been accompanied by corresponding advances in automated pre-analytical sample processing such as batch preparation, centrifugation of samples to separate sample constituents, cap removal (de-capping) to facilitate sample access, aliquot preparation, and pre-screening for hemolysis (H), icterus (I), and/or lipemia (L) (hereinafter referred to as "HIL"), or normality (N), and prescreening for other artifacts like clots, foam, or bubbles. Such automated pre-analytical sample processing may be part of a Laboratory Automation System (LAS). In some cases the LAS automatically transports the samples contained in sample tubes for pre-analytical sample processing, as well as on to analytical stations containing clinical chemistry analyzers and/or assay instruments (individually and collectively referred to as an "analyzer" or "analyzers" herein) for testing. The testing involves a reaction that generates a change that may be read and/or otherwise manipulated to determine a concentration of an analyte or other constituent contained in the sample.

LASs may handle any number of different samples contained in labeled sample tubes (e.g., including a barcode label) at one time, and the sample tubes may be of all different sizes and tube assembly types, including different cap styles (shapes) and colors, which may also be intermingled. The LAS can automatically transport the sample tubes for pre-analytical processing operations, all prior to the sample actually being subjected to clinical analysis or assaying by the one or more analyzers.

In some embodiments of automated pre-analytical sample processing, a quality check module may receive a sample tube including a sample therein and pre-screen the sample for the presence of an interferent, such as HIL. The pre-screen for HIL involves capturing one or more digital images of the sample tube and sample and then processing this image data to determine if H, I, and/or L is present, and possibly indexes (relative amounts) for H, I, and/or L if present, or may determine that the sample is normal (N). The presence of an interferent in the sample may possibly adversely affect the test results of the analyte or constituent measurement later obtained from the analyzer.

In certain apparatus, the sample container and sample are digitally imaged and processed, such as with a computer-aided, model-based system, such as by using artificial intelligence (e.g., a convolutional neural network—CNN), so that the presence or absence of an interferent (HIL or N) can be determined. The type and color of the cap can also be discerned. During imaging, images of the sample tube (including cap) and sample can be captured from multiple viewpoints.

However, such apparatus may, under certain conditions, provide variations in performance, and even variations in performance from one system to the next. Thus, improved methods and apparatus of imaging such samples and/or sample containers are sought.

SUMMARY

According to a first aspect, a calibration method is provided. The calibration method includes identifying the imaging area on each light panel with respect to each imaging device; determining a center position of the imaging area of each light panel for each imaging device; determine an optimal optical center of the imaging apparatus using the center position of each light panel for each imaging device; install a tube calibration tool in a carrier residing on a track; move the carrier on the track so that a center of the tube calibration tool is located at a closest location to the optimal optical center of the imaging apparatus; and use the center of the tube calibration tool to determine a center of a region of interest (ROI) for backlight calibration.

In another aspect, a light panel calibration method is provided. The light panel calibration method includes turning on a first drive current to a plurality of light elements of a light panel on a first side closest to a region of interest; adjusting the first drive current to the plurality of light elements of the light source on the first side until a representative intensity at the region of interest reaches a preset value; and with the drive current being still driven to the plurality of light elements of the light source on the first side, adjust the drive current to plurality of light elements of the light source on a second side until a representative intensity of the ROI reaches a second preset intensity value.

Still other aspects, features, and advantages of the present disclosure may be readily apparent from the following description illustrating a number of example embodiments. The present invention may also be capable of other and different embodiments, and its several details may be modified in various respects, all without departing from the scope of the present disclosure. Moreover, while specific advantages have been enumerated, various embodiments may include all, some or none of the enumerated advantages. The disclosure is to cover all modifications, equivalents, and alternatives falling within the scope of the claims.

BRIEF DESCRIPTION OF THE DRAWINGS

The drawings, described below, are for illustrative purposes and are not necessarily drawn to scale. The drawings are not intended to limit the scope of the invention in any way. Accordingly, the drawings are to be regarded as illustrative in nature, and not as restrictive.

FIG. 5H illustrates a pixelated image taken by imaging device 106B including a calibration tool received in a carrier wherein the calibration tool is located as close as possible to the optimal optical center according to one or more embodiments.

FIG. 5I illustrates a pixelated image taken by imaging device 106C including a calibration tool received in a carrier wherein the calibration tool is located as close as possible to the optimal optical center according to one or more embodiments.

FIG. 5J illustrates a pixelated image taken by imaging device 106A including a calibration tool received in a carrier wherein the calibration tool is located as close as possible to the optimal optical center according to one or more embodiments.

FIG. 7B' illustrates schematic front view of a light panel including a LCD mask according to one or more embodiments.

DETAILED DESCRIPTION

Figure 1:
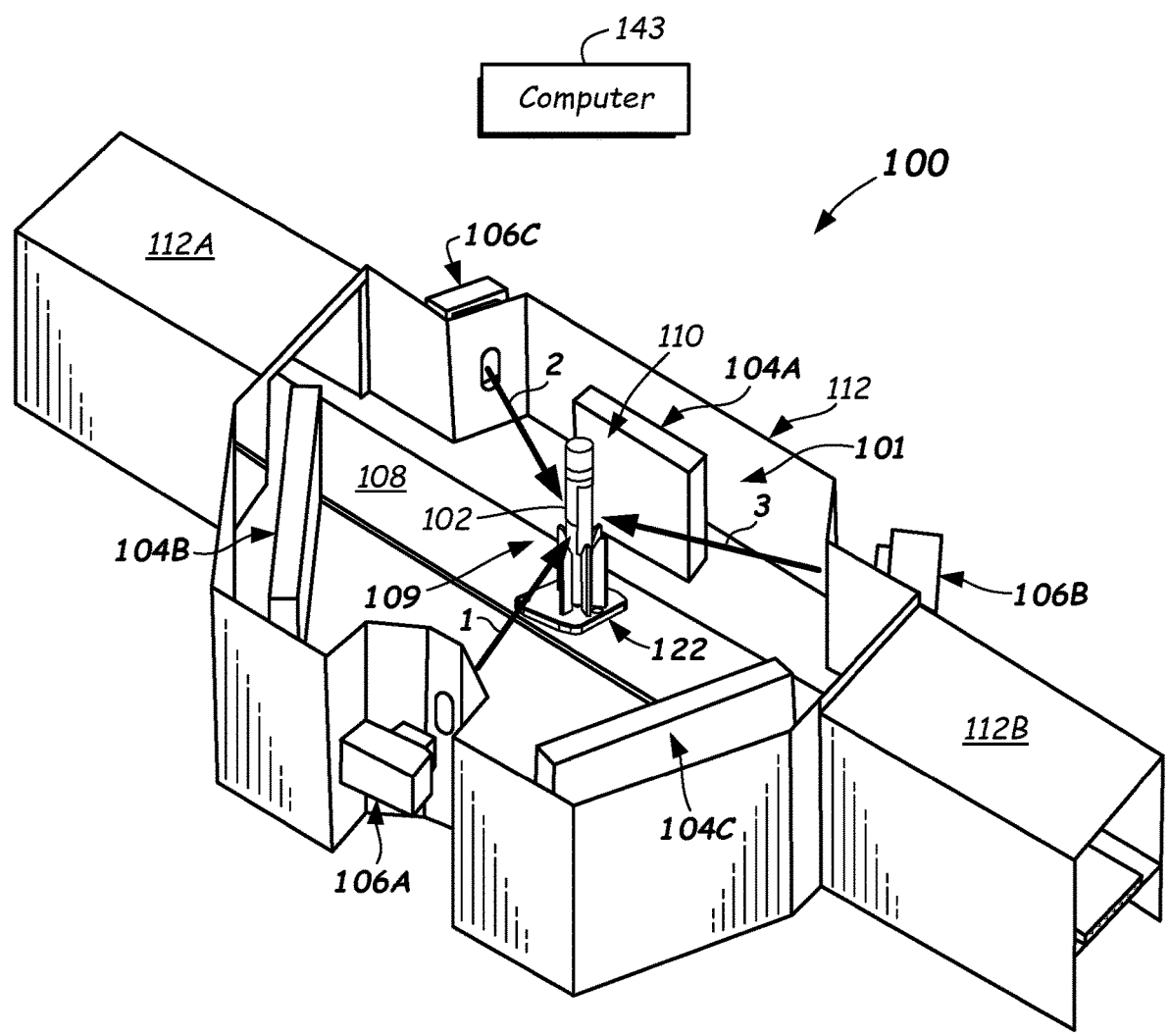
FIG. 1 illustrates a top perspective schematic view of a quality check apparatus including an imaging apparatus with which the calibration method according to one or more embodiments is used.

Background illumination calibration is used to accomplish a sample tube quality check, especially for inspecting the presence of an interferent like Hemolysis, Icterus, Lipemia (HIL) based on the color of the liquid (e.g., of a serum or plasma portion) of a sample contained in the sample container. In the present disclosure, methods and apparatus are provided to carry out the background illumination calibration of an imaging apparatus within a sample tube quality check apparatus to ensure substantially consistent illumination across multiple spectrums and multiple machines (e.g., sample tube quality check apparatus). Consistent background illumination can be achieved because a mechanical center is identified for each setup in order to get the center of the region of interest (ROI) for each light panel. With this, the method can be used to adjust the current to reach the predefined intensity value within this ROI in order to provide substantially consistent background illumination across multiple spectrums and multiple machines. Embodiments provide methods of finding the mechanical center in order to infer the ROI for each lighting panel. In other embodiments, methods of adjusting the drive current to the side-lighted light panels are provided.

With the consistent lighting across multiple quality check apparatus (machines), sample tube quality check features such as HIL interference screening based on the fluid color distribution can be made more precise. This is very useful for saving the time and resources for HIL testing, such as in relationship to testing on the analyzers.

In particular, the present disclosure relates to methods of calibrating the background illumination in a sample tube quality check apparatus that can involve lighting with various light spectra. Further, the sample tube quality check apparatus can involve lighting the sample tube and sample therein with light sources comprising backlight panels including light elements (e.g., LEDs) that are illuminated from two sides (e.g., lateral sides) of the respective backlight panels. Possible alternative solutions could utilize a photometer to manually measure the luminance and/or a spectrometer to manually measure the color distribution at the sample tube illumination area (hereinafter the imaging location). During the panel calibration, a drive current/voltage of the background illumination source can be adjusted. Optionally, exposure of the sensor may be adjusted.

According to embodiments, the disclosure relates to methods and apparatus that are setup and used to carry out calibration of background illumination, such as within a sample tube characterization apparatus (e.g., a quality check apparatus) to ensure consistent and accurate background illumination. Improving background illumination calibration can improve the discrimination capability concerning, for example, HILN detection and/or artifact detection (detection of foam, bubble(s), or clot(s)) in the sample.

In some embodiments, the disclosure relates to methods and apparatus that are setup and used to carry out background illumination calibration across multiple sample tube characterization apparatus (e.g., across multiple quality check apparatus or like machines). Background illumination, as used herein, means illumination of a back part/side of a sample tube by one or more illumination sources positioned at one or more locations in back of the sample tube and wherein the imaging device is located in front of the sample tube. For example, in some embodiments, background illumination may include background lighting from one or more illumination devices (e.g., one or more light panels), which may be located behind the sample tube, i.e., the sample tube is located between the light source and the corresponding imaging device.

Further, embodiments of the present disclosure provide methods and apparatus that are configured to calibrate a back illumination apparatus of an imaging apparatus so that the imaging apparatus can capture one or more images of a sample tube and sample therein, wherein the one or more captured images can be used to characterize one or more features of the sample, such as HILN and/or presence of an artifact, for example. In quality check apparatus, a check of the quality of the specimen is utilized to ensure appropriateness of one or more tests to be performed on the sample. For example, if the sample contains H, I and/or L, an error can be flagged and the sample may be redrawn and or further processed to ameliorate the interferent. Therefore, improved background illumination may improve characterization of the sample. Thus, if an anomaly in the sample is identified, the sample can be diverted before being sent to the analyzer, thus saving analyzer resources and possibly averting tests that may have yielded errant results.

In particular, embodiments of the disclosure are directed at calibration apparatus and calibration methods configured to provide improved image data from one or more imaging devices that have been appropriately calibrated. In further embodiments, methods and apparatus enabling rapid calibration of one or more like imaging apparatus (e.g., substantial clones) are provided.

Figure 2:
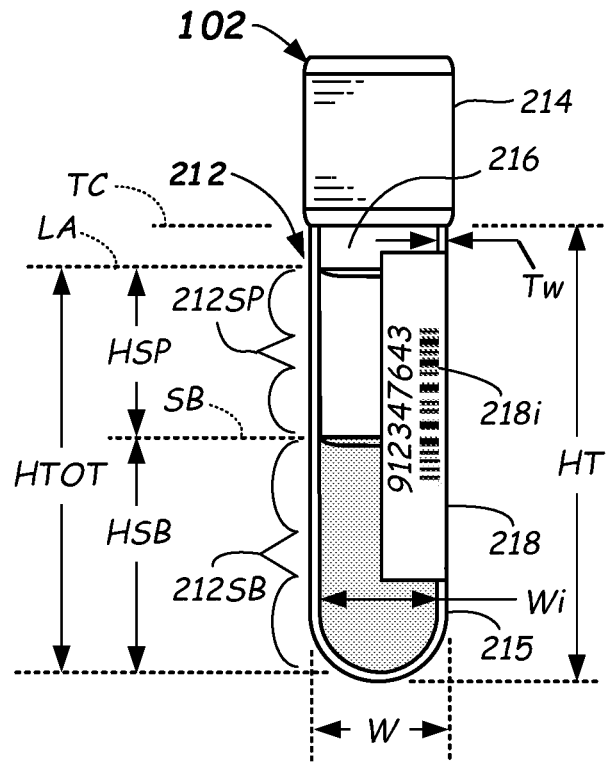
FIG. 2 illustrates a side plan view of a sample tube containing a separated (e.g., centrifuged) sample therein.
Figure 3:
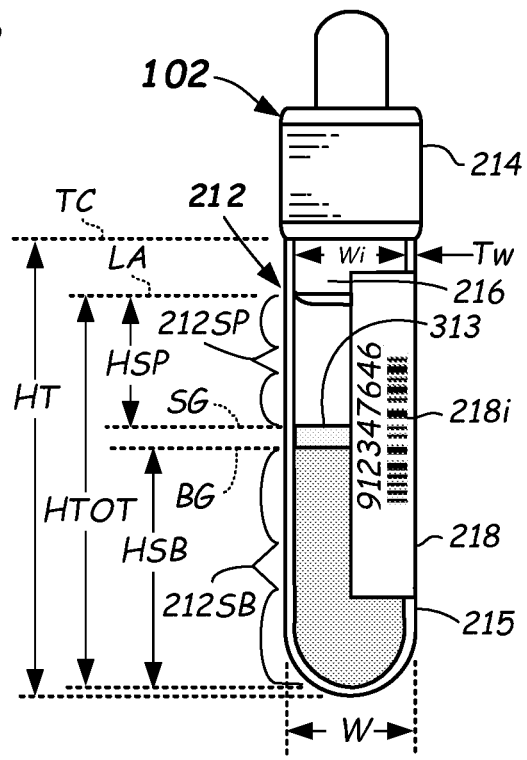
FIG. 3 illustrates a side plan view of a sample container containing a separated (e.g., centrifuged) sample and further including a gel separator therein.

Referring now to FIGS. 2 and 3, in some embodiments, a sample 212 (specimen), as described herein, is collected in a sample tube 102, such as a blood collection tube, and may include a settled blood portion 212SB and a serum and plasma portion 212SP after separation (e.g., after fractionation using centrifugation) as is shown. The settled blood portion (sometimes referred to as the "packed cell portion") is made up blood cells such as white blood cells (leukocytes), red blood cells (erythrocytes), and platelets (thrombocytes), which are aggregated and separated from the serum or plasma portion 212SP. The settled blood portion 212SB is generally found at the bottom part of the sample tube 102. The serum or plasma portion 212SP is the liquid component of blood that is not part of the settled blood portion 212SB. It is generally found above the settled blood portion 212SB. Plasma and serum differ primarily in the content of coagulating components, primarily fibrinogen. Plasma is the un-clotted liquid, whereas serum refers to blood plasma that has been allowed to clot, either under the influence of endogenous enzymes or exogenous components or a coagulant.

In some sample tubes 102, a small gel separator 313 (e.g. plug as shown in FIG. 3) may be used, which positions itself between the settled blood portion 212SB and the serum or plasma portion 212SP during fractionation. It serves as a barrier to prevent mixing of between the two portions and may be provided in the sample tubes 102 prior to fractionation in a conventional manner.

Shown in FIG. 1 is an embodiment of a sample tube quality check apparatus 100 with which the background calibration method according to this disclosure can be used. FIG. 1 shows an example of the optical imaging apparatus 101 within the quality check apparatus 100 including multiple light sources 104A-104C (e.g., light panels) and multiple imaging devices 106A-106C. In some operations, the light sources 104A-104C are mainly used to back illuminate the sample tube 102 from the back side of the sample tube 102 so each of the respective imaging devices (e.g., photodetector, charge coupled device (CCD), digital camera, complementary metal oxide semiconductor (CMOS) sensor, or the like) in front of the sample tube 102 can inspect a fluid property of the sample 212 in the sample tube 102. The fluid property may be HILN, a volume or dimension of one or more of the components of the sample 212, and/or the presence of an artifact (e.g., clot, foam, bubble) therein, for example. Background illumination is the topic of this calibration method, as opposed to foreground illumination (front lighting).

For fluid quality inspection like HIL interferent pre-screening, the light sources comprising backlight panel can utilize light emitting diodes (LEDs) emitting various spectrums, as different interferent types can behave differently across different spectra. As each quality check apparatus 100 (e.g., machine) can have slightly different setups of imaging devices (e.g., cameras, sensors, and the like), backlight panels, and sample tube track, the background illumination calibration should take some or all of these variations into account to ensure consistent observations within the quality check apparatus 100 as well as across multiple other quality check apparatus (other machines).

To this end, according to a first aspect of the background calibration method, it is proposed to conduct the background illumination in multiple stages:

(1) optical center localization,
(2) mechanical center localization, and
(3) LED adjustment.

Thereafter, an LED health check may be conducted. The LED health check may involve reviewing local intensities of one or more other regions (can be multiple other regions) on the light panel and comparing these localized intensity values to pre-established intensity values of a region of interest (ROI). Such health checks of other regions may determine when one or more regions may be malfunctioning. Enabling consistent background lighting for a single quality check apparatus 100, and in particular, across multiple imaging quality check apparatus (like quality check apparatus 100) can ensure proper and consistent performance and sample characterization. Further performing heath checks can possibly identify defective regions of the backlight panels and/or imaging devices.

As shown in FIG. 1, the light sources 104A-104C and imaging devices 106A-106C can be arranged to provide lateral 2D images of the sample container 102, and of the sample 212 contained therein, from one or more different lateral viewpoints (e.g., three viewpoints 1, 2, and 3, as shown). More or less viewpoints could be used. During image capture for sample characterization, the sample container 102 and sample 212 may be backlight illuminated, i.e., illuminated behind the sample container 102 and sample 212. For example, background lighting may be provided for imaging device 106A by light source 104A (e.g., a light panel), for imaging device 106B by light source 104B (e.g., a light panel), and for imaging device 106C by light source 104C (e.g., a light panel). Back lighting with the light sources 104A-104C (e.g., light panels) can be coupled with high dynamic range (HDR) image processing of the images taken by the imaging devices 106A-106C and processing thereof. Any suitable characterization method may be used to quantify and characterize the sample 212, wherein the characterization includes quantification of intensities of light transmission through the sample 212 at various spatial locations within an image window. The imaging window should be large enough to capture images of the portion that are desired to be characterized, such as the serum or plasma portion 212SP, settled blood portion 1212SB, or gel separator 313 (sees FIGS. 2-3).

In some embodiments, the characterization methods and apparatus may be used to determine a location of the interface boundaries of the serum or plasma portion 212SP and/or the settled blood portion 212SB, and/or gel separator 313, as well as the volume and/or depth of these components with great precision using image processing (e.g., HDR image processing) together with background illumination. In short, the illuminated 2D image data sets for one or more viewpoints (e.g., viewpoints 1-3) may be used to characterize the sample 212. In particular, 2D image data sets obtained with background lighting with the light sources 104A-104C may also be used to determine information about the sample 212, such as whether an interferent, such as hemolysis (H), icterus (I), and/or lipemia (L) (hereinafter "HIL") is present in the sample, or if the sample is normal (N), or even the presence of an artifact (e.g., clot, foam, or bubble) therein.

Again referring to FIG. 1, in one or more embodiments, the quality check module 100 may be provided as part of the LAS. The LAS can include a track 108 (only a portion shown) that functions to transport the sample container 102 including the sample 212 to one or more analyzers (not shown), and to the quality check module 100 that is provided at any suitable location on or along the track 108. For example, the quality check module 100 may be located at a loading station, adjacent to or part of an analyzer, or elsewhere along the track 108, so that the sample 212 and sample container 102 can be pre-screened and characterized. In certain embodiments, the characterization can take place while the sample container 102 is residing on a carrier 122 that is moveable along the track 108. However, to be clear, the quality check module 100 including background lighting may not be included on a track 108 and the sample container 102 including the sample 212 may be loaded and unloaded from the quality check module 100 either manually or with the action of a robot, for example. For example, a robot may unload the sample container from a loading station, centrifuge it, place it into a holder of a quality check module next to a loading station or track 108, and then after imaging to accomplish pre-screening, place the sample container 102 into a carrier on the tract 108.

In some embodiments, the characterization may include data processing (e.g., of HDR image processing) including capturing multiple images at multiple exposures (e.g., exposure times) and with background illumination. The image processing may involve using multiple different spectra having different nominal wavelengths. The multiple images may be obtained using the imaging devices 106A-106C for the multiple viewpoints 1-3, and possibly with back illumination using multiple different spectra for each of the multiple viewpoints 1-3.

The images may be produced using panelized illumination (e.g., using light panels) for each viewpoint 1-3. The spectral light sources for background illumination may include red (R) light sources, green (G) light sources, and blue (B) light sources. Optionally, white light (W), near-infrared (NIR), or even infrared (IR) light sources may be used. Images at multiple exposure times for each spectrum may be obtained by the quality check module 100. For example, 4-8 images at different exposure times may be obtained at each spectrum (or wavelength range). These multiple images may then be further processed by a computer 143 to generate sample characterization results. Any suitable segmentation and/or characterization method may be used.

As part of the image processing, calibration is carried out to suitably adjust image intensities to ensure that the background lighting is of the proper intensity for each spectrum (e.g., R, G, B, etc.) of light used for illumination for each image capture device 106A-106C. Further details of the calibration methods of imaging apparatus 101 of quality check module(s) 100 will be further described with reference to FIGS. 1-8 herein.

Typically, a sample 212 (FIGS. 2 and 3) to be automatically processed may be provided in a sample container 102, which may be capped with a cap 214. The cap 214 may have different shapes and/or colors (e.g., red, royal blue, light blue, dark green, light green, black, grey, tan, orange, or yellow, or combinations of colors), which may have meaning in terms of what test the sample container 102 is used for, the type of additive contained therein, whether the specimen should be under a vacuum, or the like. Other colors may be used. According to one aspect, it may be desirable to image the cap 214 to characterize information about the cap 214 so that it can be used to cross check with test orders and verify the correct sample tube 102 was used for the test ordered. For example, in some embodiments, background lighting may be used to image the opacity of the cap 214.

Each of the sample containers 102 may be provided with identification information 218i (i.e., indicia), such as a barcode, alphabetic, numeric, alphanumeric, or combination thereof that may be machine readable. The identification information 218i may indicate, or may otherwise be correlated, via a Laboratory Information System (LIS) 147, to a patient's identification as well as tests to be carried out on the sample 212, or other information from a laboratory information system (LIS), for example. Such identification information 218i may be generally provided on a label 218 adhered to, or otherwise provided on the side of, the sample container 102. The label 218 generally does not extend all the way around the sample container 102, or all along a height of the sample container 102. In some embodiments, multiple labels 218 may be adhered, and may slightly overlap each other. Accordingly, although the label 218 may occlude a view of some portions of the sample 212, but other portions of the sample 212 may still be viewable from one or more of the viewpoints 1-3. One or more embodiments of the characterization method and quality check module 100 can enable the characterization of the sample 212 without undesirable rotation of the sample container 102, by imaging the sample 212 from multiple viewpoints (e.g., viewpoints 1, 2, and 3, for example). Other numbers of multiple viewpoints may be used.

As best shown in FIGS. 2 and 3, the sample 212 may include a serum or plasma portion 212SP and a settled blood portion 212SB contained within the tube 215. Air 216 may be provided above the serum and plasma portion 212SP and a line of demarcation between the air 216 and the serum or plasma portion 212SP is defined as a liquid-air interface (LA). A line of demarcation between the serum or plasma portion 212SP and the settled blood portion 212SB is defined herein as a serum-blood interface (SB), and is shown in FIG. 2. An interface between the air 216 and the cap 214 is referred to herein as a tube-cap interface (TC). A height of the serum or plasma portion 212SP is (HSP) and is defined as a height from a top of the serum or plasma portion 212SP to a top of the settled blood portion 212SB. A height of the settled blood portion 212SB is (HSB) and is defined as a height from a bottom of the settled blood portion 212SB to a top of the settled blood portion 212SB at SB in FIG. 2. HTOT in FIG. 2 is a total height of the sample 212 and HTOT=HSP+HSB.

In cases where a gel separator 313 is used (see FIG. 3), a height of the serum or plasma portion 212SP is (HSP) and is defined as a height from the top of the serum or plasma portion 212SP at LA to the top of the gel separator 313 at SG. A height of the settled blood portion 212SB is (HSB) and is defined as a height from the bottom of the settled blood portion 212SB to the bottom of the gel separator 313 at BG in FIG. 3. HTOT in FIG. 3 is the total height of the sample 212 and is defined as HTOT=HSP+HSB+height of the gel separator 313.

In each case, the wall thickness is Tw, the outer width is W, and the inner width of the sample container 102 is Wi. A height of the tube (HT) is defined herein as the height from the bottom-most part of the tube 215 to the bottom of the cap 214. Characterization methods using foreground illumination and/or background illumination may be used to determine any of these geometrical attributes.

Figure 4A:
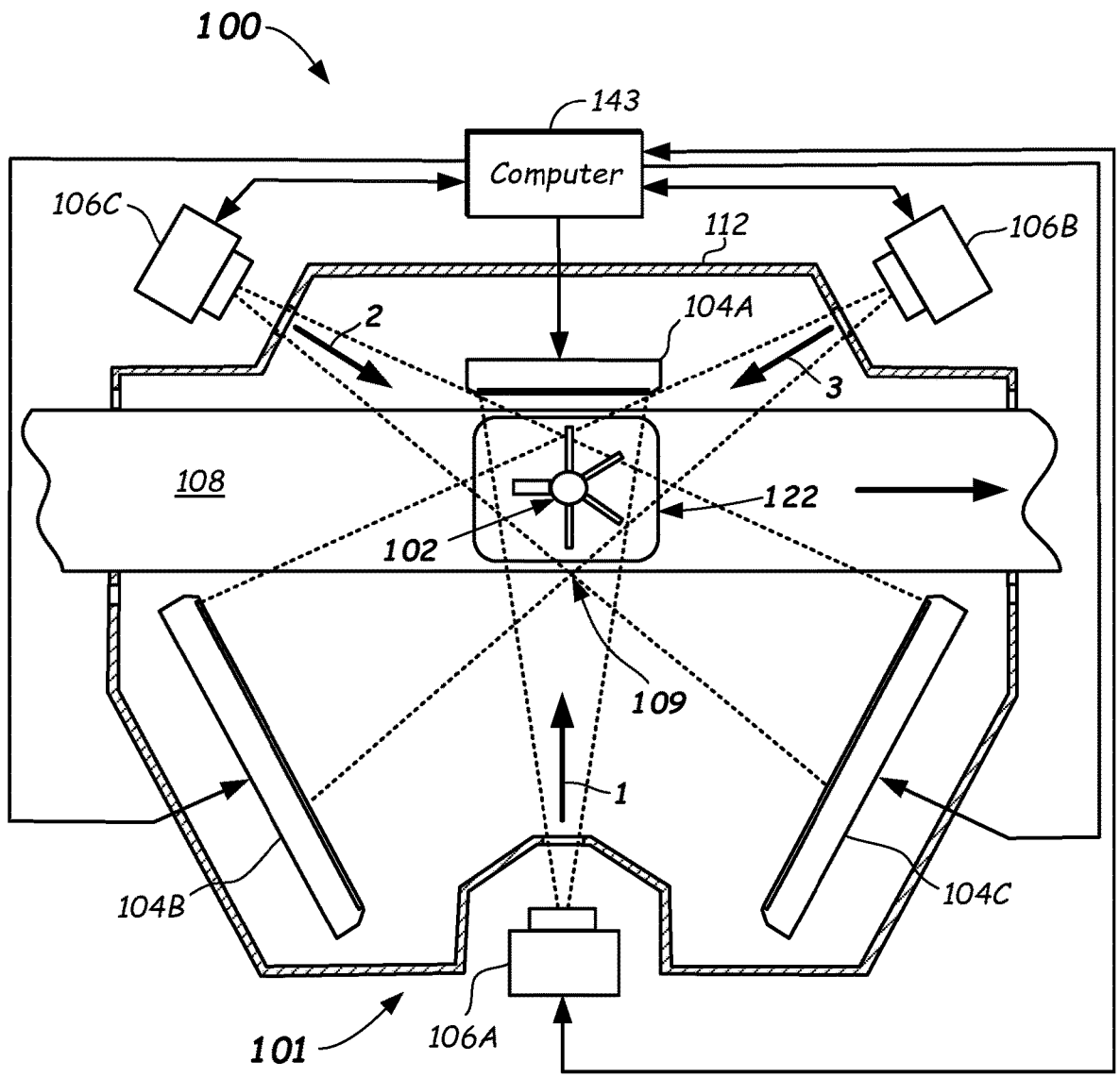
FIG. 4A illustrates a top view of a quality check apparatus, with the top removed for illustration purposes, and including an imaging apparatus and a sample tube including a sample to be characterized at the imaging location according to one or more embodiments.
Figure 4B:
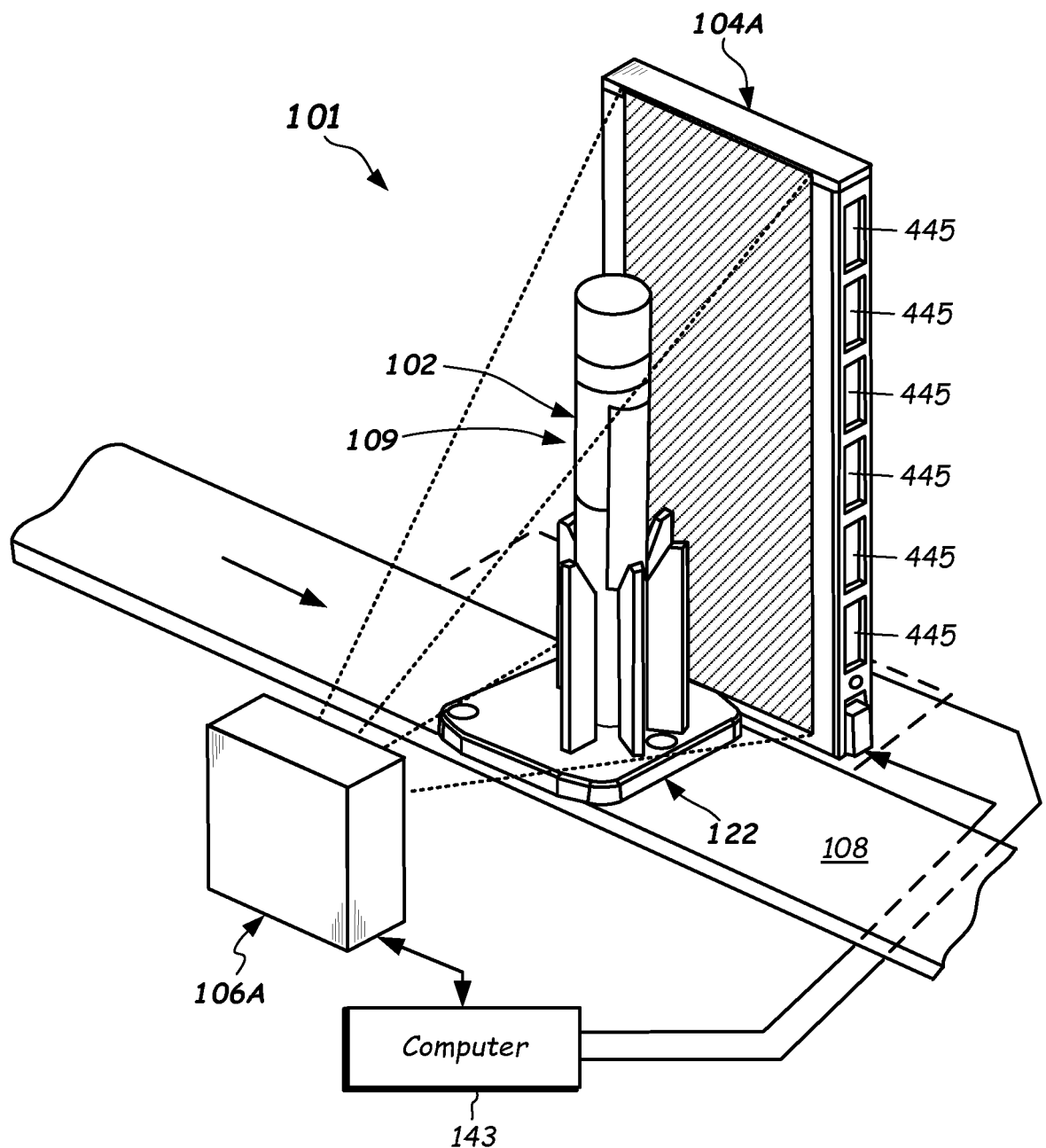
FIG. 4B illustrates a front perspective view of an imaging apparatus of a quality check apparatus, with housing removed for illustration purposes, including a panelized light source and a sample tube installed at the imaging location in a carrier according to one or more embodiments.

As discussed above, a carrier 122 may move the sample container 102 along the track 108 and stop at an imaging location 109 in the quality check apparatus 100 as shown in FIGS. 1 and 4A-4B. Carrier 122 can be passive, non-motored puck that may be configured to carry a single sample container 102 on the track 108, where the track 108 is movable, or carrier 122 may be automated including an onboard drive motor that may be programmed to move about the track 108 and stop at pre-programmed locations, such as at the imaging location 109. In either case, the carrier 122 may include a holder configured to hold the sample container 102 in an upright orientation so that it can be readily imaged, such as from one viewpoint (FIG. 4B) or from the multiple viewpoints 1-3 (FIGS. 1 and 4A). The holder may include a plurality of fingers or leaf springs, combinations thereof, or other suitable mechanism that may support and secure the sample container 102 in the carrier 122, but where some of which may be laterally movable or flexible to accommodate for different sizes (diameters) of sample containers 102 to be received therein.

Quality check apparatus 100 may be controlled by the computer 143, which may be a microprocessor-based central processing unit (CPU), having a suitable memory and suitable conditioning electronics, drivers, and software for operating the various automated apparatus components. Computer 143 may control operation of the quality check apparatus 100 and the characterizations, processing, illuminations, and imaging described herein.

Pre-screening the sample 212 also allows for accurate quantification of the relative amounts of the serum or plasma portion 212SP and/or the settled blood portion 212SB, and/or a ratio there between. Further, pre-screening may determine physical vertical locations of TC, LA, SB, SG, and/or BG, and/or a bottom-most part of sample container 102. Quantification ensures that the sample 212 can be stopped from progressing on to the one or more analyzers, if an insufficient amount of serum or plasma portion 212SP is available to carry out the tests that have been ordered thereon. In this way, inaccurate test results may be avoided via avoiding the possible aspiration of air. The ability to accurately quantify the physical location of LA and SB or SG may minimize not only the possibility of aspirating air, but also minimize the possibility of aspirating either settled blood portion 212SB or gel separator 313 (if present). Thus, clogging and contamination of the sample aspirating pipette used to aspirate serum or plasma portion 212SP for the analyzers or at an aliquoting station may be avoided or minimized.

With reference to FIGS. 1 and 4A, a first embodiment of a quality check apparatus 100 including light sources 104A-104C embodied as a light panel assemblies, which may include spectrally-switchable light sources, is shown and described. The images obtained by the quality check apparatus 100 may allow for precise aspiration pipette positioning, determination that a sufficient amount (e.g., volume or height HSP) of the serum or plasma portion 212SP is available for the tests that have been ordered, and/or the identification of H, I, and/or L or N (hereinafter HILN), for example. Thus, using the quality check module 100 may help avoiding pipette clogging, air aspiration by the pipette, and/or identify unacceptable levels of HIL, such that valuable analyzer resources are not wasted and that confidence in the test results may be improved.

Now referring to FIG. 4A, an embodiment of a quality check apparatus 100 is shown. Quality check apparatus 100 may include imaging devices 106A-106C configured to capture a digital image (i.e., a pixelated image) at the imaging location 109 from multiple lateral viewpoints (e.g., viewpoints 1-3). Imaging devices 106A-106C may be any suitable type of digital imaging devices such as digital cameras, charged coupled devices (CCD), arrays of photo-detectors, CMOS sensors, or the like. The imaging devices 106A-106C may be capable of taking digital images (pixelated images containing pixels) having any suitable image sizes so as to capture images of at least the serum or plasma portion 212SP and in some embodiments, the settled blood portion 212SB and the cap 214. Other image sizes may be used.

The imaging devices 106A-106C may be provided in close proximity to, and trained or focused to capture a view window at an imaging location 109 including an expected location of the sample container 102. In some embodiments, the sample container 102 may be placed at or stopped at the imaging location 109, such as by stopping on the track 108 or being placed at the imaging location 109 by a robot (not shown), so that it is approximately located in a center of the view window.

Referring again to FIGS. 1 and 4A, the quality check apparatus 100 may include spectrally-switchable light sources 104A-104D, as shown provided by light panel assemblies to enable providing spectrally-switchable lighting (back lighting as desired). The spectrally-switchable light sources 104A-104C may be spectrally-switchable between at least two light spectra, and in some embodiments, between 3 or more discreet light spectrum. The light sources 104A-104C may be constructed as described in US Pat Pub. 2018/0372648, for example.

Figure 7A:
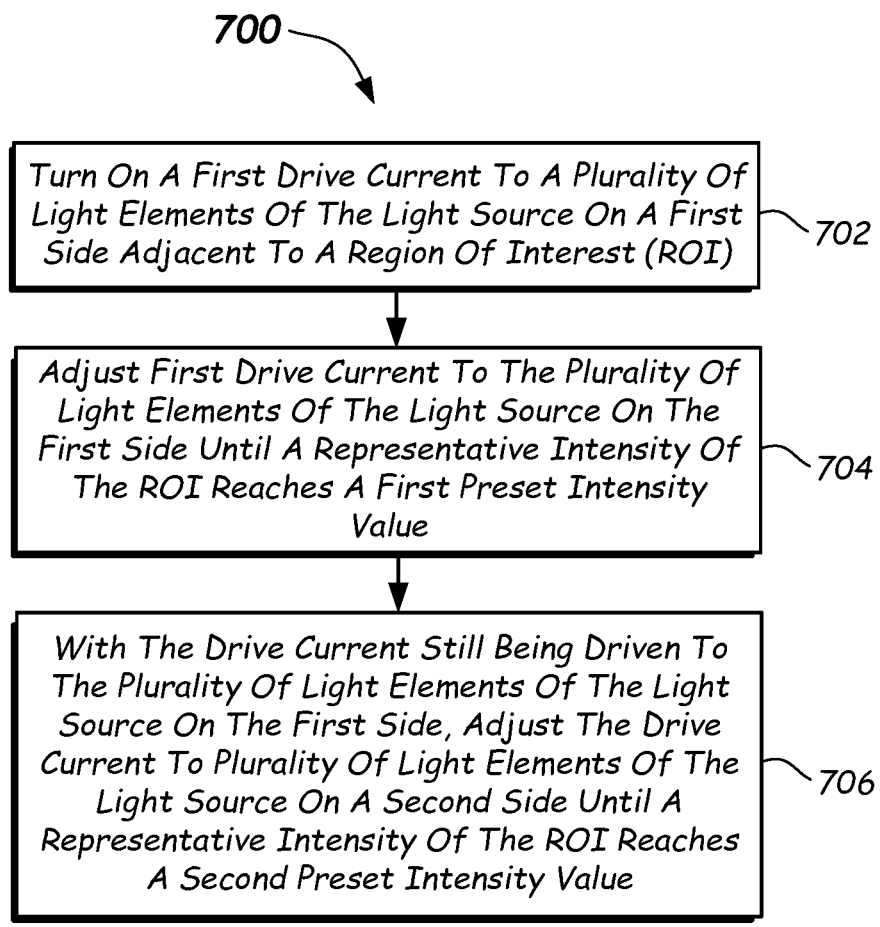
FIG. 7A illustrates flowchart of a calibration method adapted to calibrate a light panel according to one or more embodiments.
Figure 7B:
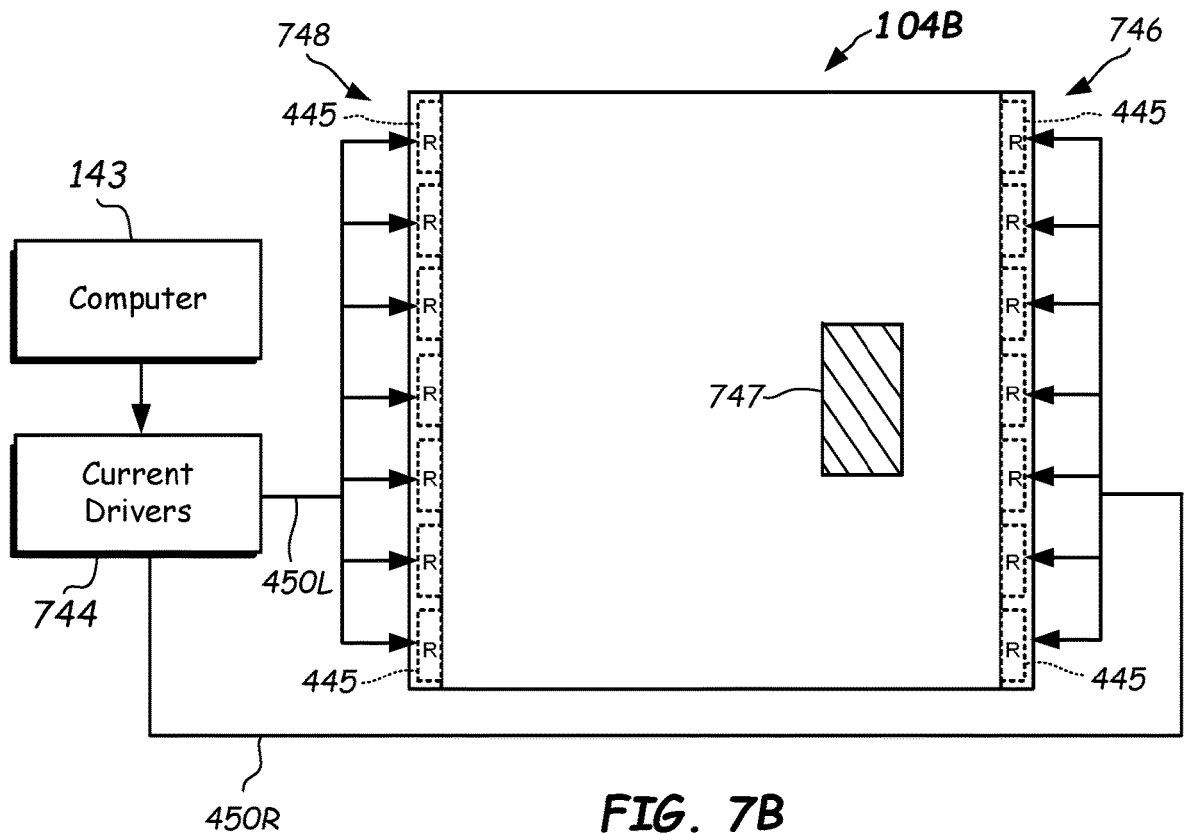
FIG. 7B illustrates schematic front view of a light panel including multiple light elements on the respective lateral sides thereof according to one or more embodiments.
Figure 7B:
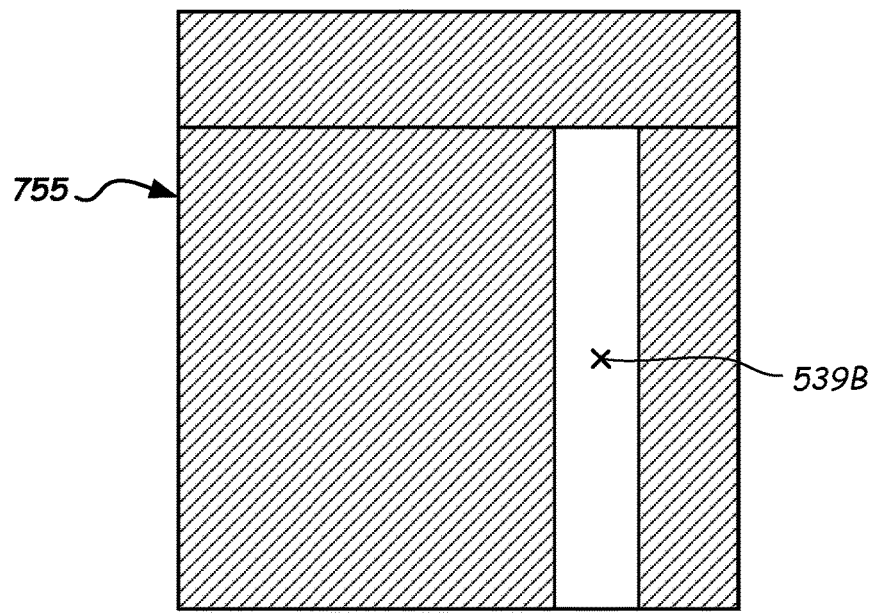
Figure 7C:
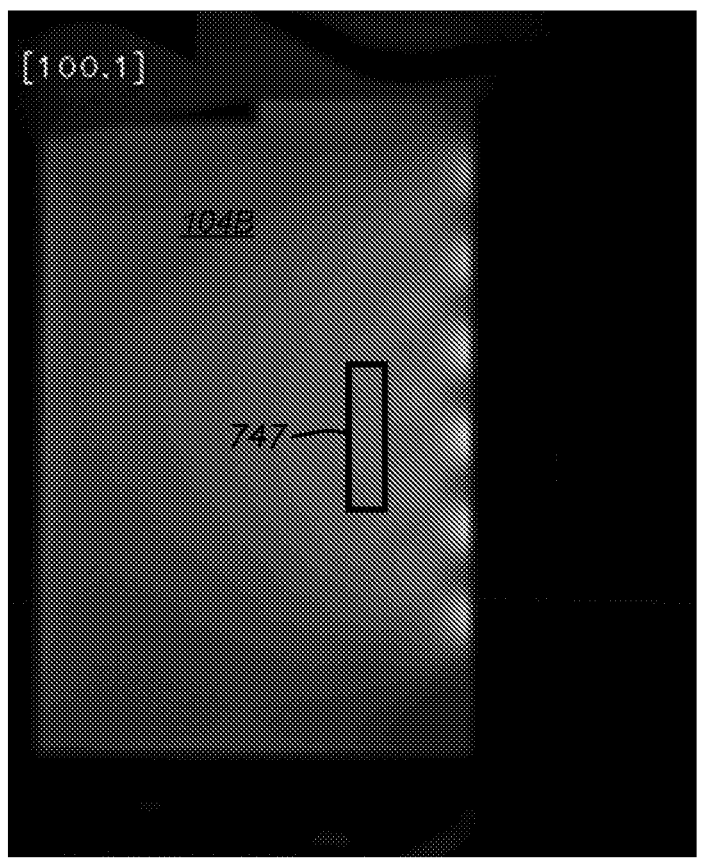
FIG. 7C illustrates front view pixelated image of the light panel 104B taken by imaging device 106B after the illumination of the multiple light elements on first side thereof according to one or more embodiments.

The light sources 104A-104D may provide switchable multi-spectral illumination. For example, in one embodiment shown in FIG. 4A, the light source 104A may be a light panel with an array of lighting elements 445. The other panels in FIG. 4A may be constructed in the same manner as in FIG. 4B. Each light panel (e.g., light sources 104A-104C) may include a plurality of independently switchable lighting elements 445, or lighting elements 445 may be switchable in groups, such as LEDs that have different light emission spectra. The lighting elements 445 (LEDs) may be arranged along the respective sides of the panels as is shown in FIGS. 4B and 7B. The switching of the lighting elements 445 may be accomplished by software operable on the computer 143 coupled with an appropriate power source and current drivers (744—FIG. 7B). Thus, the light sources 104A-104C may be illuminated at multiple different spectra having different nominal wavelengths by selecting only some of the lighting elements for illumination at a time.

For example, LEDs may include different colored LEDs, such as red LEDs (R), green LEDs (G), and blue LEDs (B) that emit light spectra at different nominal wavelengths. The light panel assemblies may emit red light at 634 nm+/−35 nm, green light at 537 nm+/−35 nm, and blue light at 455 nm+/−35 nm, for example. In particular, the light arrays may include clusters of R, G, & B LEDs that may be repeatedly arranged in a repeating pattern along the height of the light arrays. Each of the same-colored LEDs may be illuminated at once. For example, each of the red LEDs may be turned on simultaneously to provide red illumination from the light panel assembly to back illuminate the sample container 102 and sample 212 at the imaging location 109 during imaging thereof. Likewise, each of the green LEDs may be turned on simultaneously to provide green illumination of the imaging location 109 during imaging. Similarly, each of the blue LEDs may be turned on simultaneously to provide blue illumination at the imaging location 109 during imaging.

It should be recognized that R, G, and B are only examples, and that other wavelength light elements 445 may be used, such as white light elements (e.g., wavelength range of about 400 nm to about 700 nm) may be selected for certain types of background and/or foreground light imaging. In other embodiments, UV (wavelength range of about 10 nm to about 400 nm), near infra-red (NIR—wavelength range of about 700 nm to about 1250 nm) or even infrared (IR-wavelength range of about 1250 nm to about 2,500 nm) may be included, and may be switched on at times for certain types of imaging. When multiple panels and viewpoints are used, each respective color image is taken separately with only the back illumination for that particular imaging device 106A-106C being illuminated.

Calibration Methods

Figure 5A:
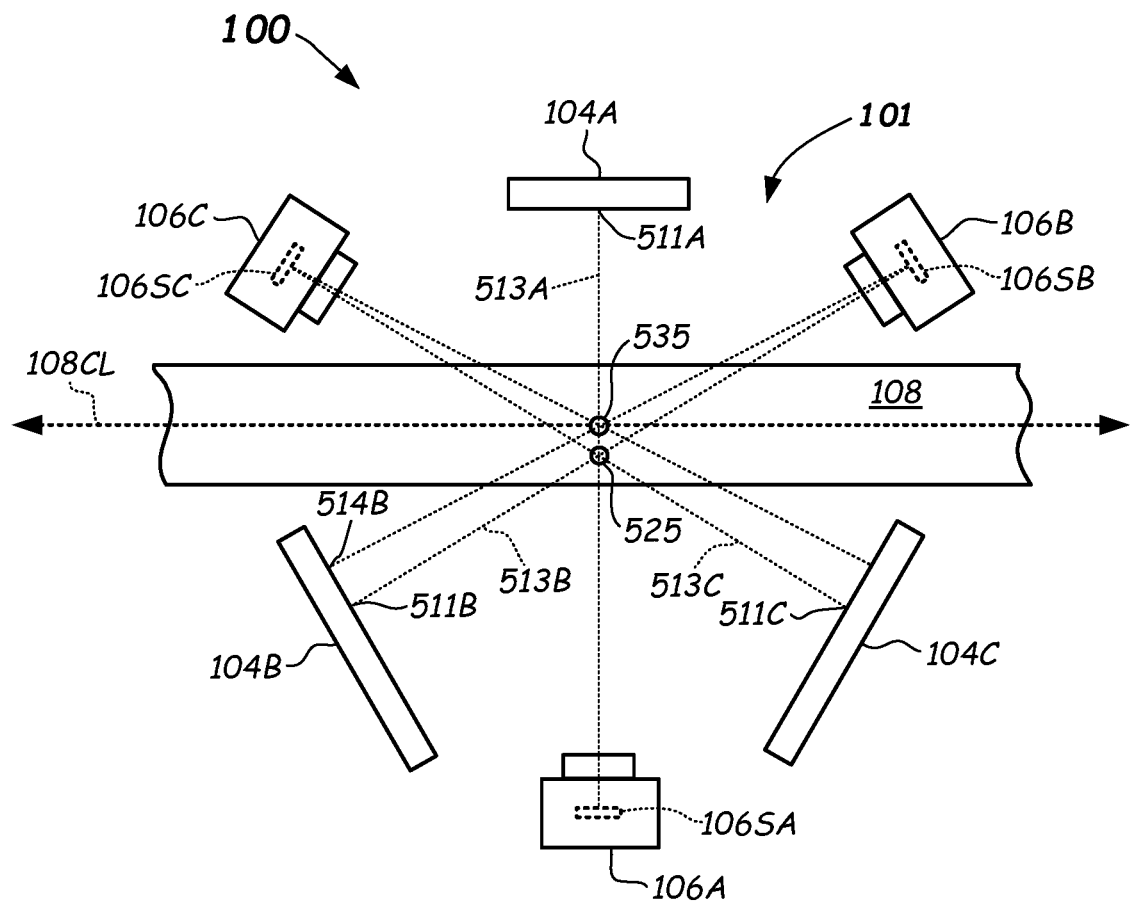
FIG. 5A illustrates a top schematic view of an imaging apparatus of a quality check apparatus, with housing removed for illustration purposes, illustrating a mechanical center and an optimal optical center according to one or more embodiments.

Referring now to FIG. 5A, a schematic view of the various imaging devices 106A-106C, and light sources 104A-104C in the imaging apparatus 101 of a quality check apparatus 100 are shown. Also shown is the centerline 108CL of the track 108 that the carrier 122 (FIG. 1) that carries the sample tube 102 travels upon.

Figure 6:
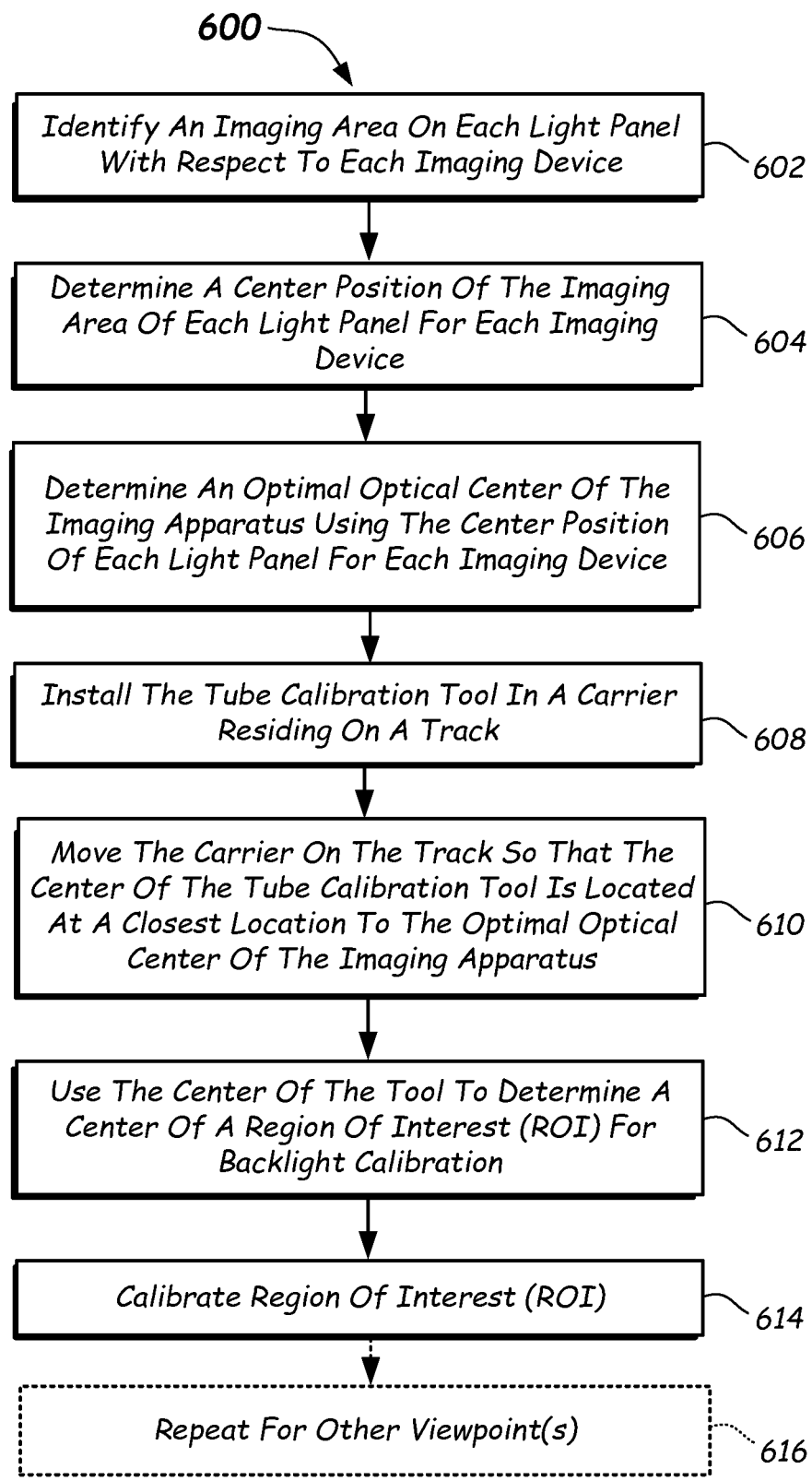
FIG. 6 illustrates flowchart of a calibration method adapted to calibrate an imaging apparatus according to one or more embodiments.

Referring also to FIG. 6, in a first stage, the calibration method 600 operates to locate an optical center location in the light sources 104A-104C of an imaging apparatus 101, which then can be used to define a region of interest (ROI) within the imaging apparatus 101 of the sample quality check apparatus 100 that can receive optimal lighting for backlighting and characterization of a sample tube 102 and sample 212 received therein. This can be done by first locating the optimal optical center 525 of the imaging apparatus 101. This location can involve connecting a sensor optical center of each sensor 106SA-106SC of the imaging devices 106A-106C to each corresponding projected center 511A-511C of the respective light sources 104A-104C. The projected center 511A-511C is a location resulting from a normal projection from each sensor optical center to the respective light source 104A-104C. The projected centers 511A-511C may therefore be offset from the physical centers of the respective light sources 104A-104C, and especially for light sources 104B, 104C. The optimal optical center 525 is located at the closest point to the intersections of these three lines 513A-513C as shown in the FIG. 5A. The mechanical center 535 is located at a position offset from the optimal optical center 525 and is a position along the centerline 108CL of the track 108.

Figure 5B:
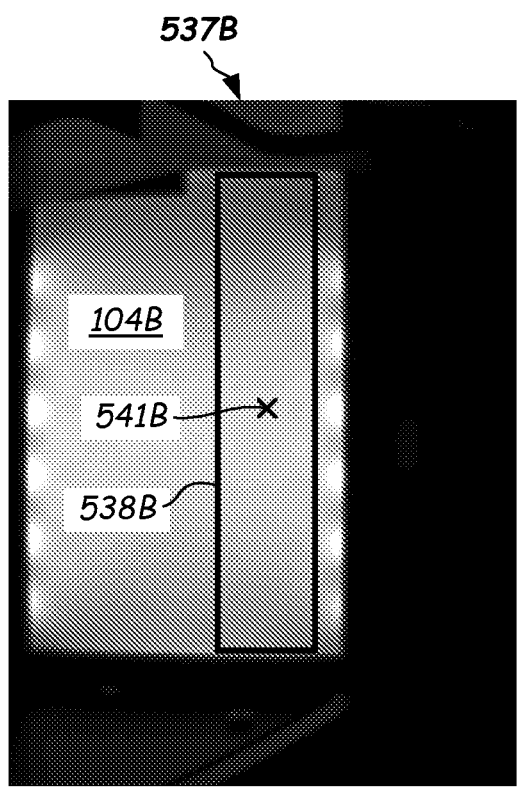
FIG. 5B illustrates a pixelated image taken by imaging device 106B including an optical region positioned on the light panel 104B and located at a lateral geometrical center of the image and spanning vertically the height of the panel according to one or more embodiments.
Figure 5C:
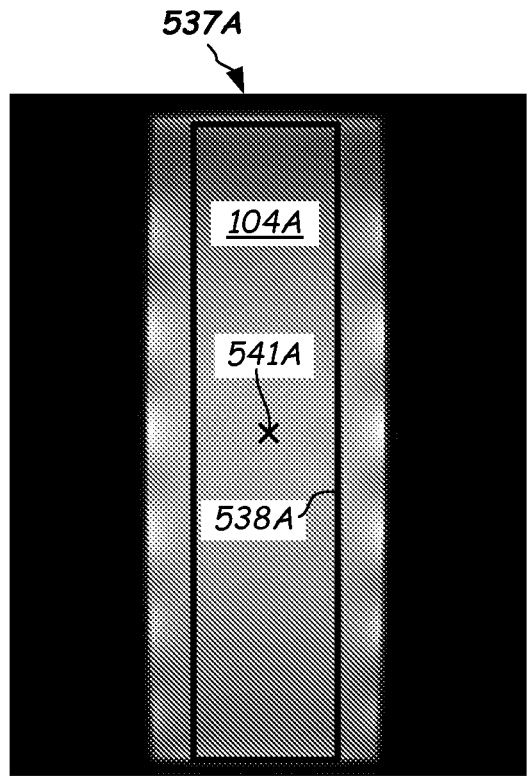
FIG. 5C illustrates a pixelated image taken by imaging device 106A including an optical region positioned on the light source 104A and located at a lateral geometrical center of the image and spanning vertically the height of the panel according to one or more embodiments.
Figure 5D:
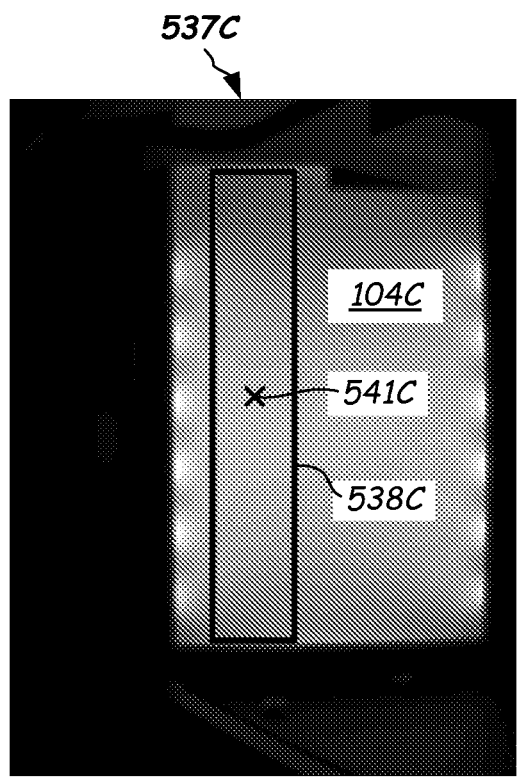
FIG. 5D illustrates a pixelated image taken by imaging device 106C including an optical region positioned on the light panel 104C and located at a lateral geometrical center of the image and spanning vertically the height of the panel according to one or more embodiments.

In order to locate the optimal optical center 525, we first detect the center line (physical vertical centerline) of each backlight panel 104A-104C. The physical center is shown in FIGS. 5B-5D. The three light sources 104A-104C as observed by the direct facing imaging devices 106A-106C are shown in FIGS. 5B-5D, where the rectangle in each image indicates an optical region that is the expected imaging area 538A-538C for back illuminating the sample tube 102. FIGS. 5B-5D illustrate images 537A-537C from (taken by) respective imaging devices 106A-106C and showing the orientation of respective light sources 104A-104C (light panels) therein with the imaging area 538A-538C shown positioned within the images 537A-537C. The identified imaging area 538A-538C is a window of arbitrary width, but that is laterally centered on the center position (identified by crosses 541A-541C) of each image 537B and 537C. As can be seen, the light panels (lighted areas) are not centered on the images 537A-537C. Crosses 541A-541C are shown as having horizontal positions located at the center of the width of each of the respective images 538A-538C. The vertical positions of the crosses 541A-541C are shown approximately as the vertical center of the respective light sources 104A-104C. Thus, in block 602, an imaging area 538A-538C is identified with respect to each imaging device 106A-106C. The imaging area 538A-538C can be wide enough to accommodate an expected width of the sample tube 102, for example, and extend high enough and low enough in extent to approximately cover the illuminated panel area of the light sources 104A-104C approximately from top to bottom. If multiple different width sample tubes 102 are to be imaged, the imaging area 538A-538C can be wide enough to accommodate the widest tube.

Next in block 604, the center position 544A-544C of the unmasked imaging areas 539A-539C of each light source 104A-104C is determined. For example, an LCD mask layer may be superimposed over each light source 104A-104C. This can be done by using the LCD mask 755 in front of each light source 104A-104C. The masked parts of the LCD mask 755 are shown hatched in FIG. 7B'. Given the light panel setup in one embodiment as shown in FIGS. 1 and 4A, where light source 104B and light source 104C are further away from the mechanical center 535 of the imaging location 109 as compared to light source 104A, the light source 104B and light source 104C can be made to be larger than light source 104A in order to provide comparable lighting.

By masking out, such as with the LCD mask 755, all the light except the expected unmasked imaging area 539A-539C in front of the light sources 104A-104C, the center position 544A-544C of each light source 104A-104C can be optically located by locating the boundaries of the central segments within search windows 540A-540C. The horizontal size of the search windows 540A-540C is determined by the lateral width of 104A-104C. The search windows 540A-540C vertical size can be pre-determined empirically, such as by either using a fixed size such as 100 pixels or ¼ of the height of 538A-538C. The search windows 540A-540C are positioned vertically at the vertical center of the respective light source 104B based on its illuminated lighting area as viewed from the respective image capture device 106A-106C.

Figure 5E:
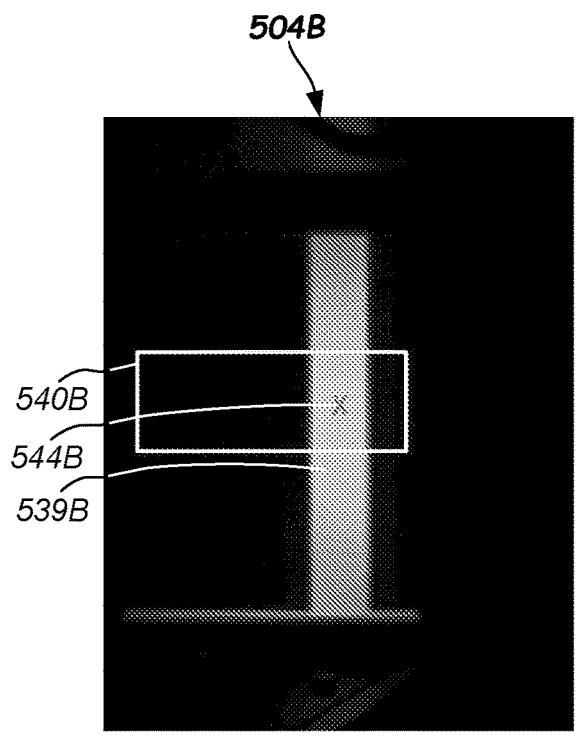
FIG. 5E illustrates a pixelated image taken by imaging device 106B including a masked region formed by an LCD mask on light panel 104B and illustrating a second optical region (the unmasked region) of the image according to one or more embodiments.
Figure 5F:
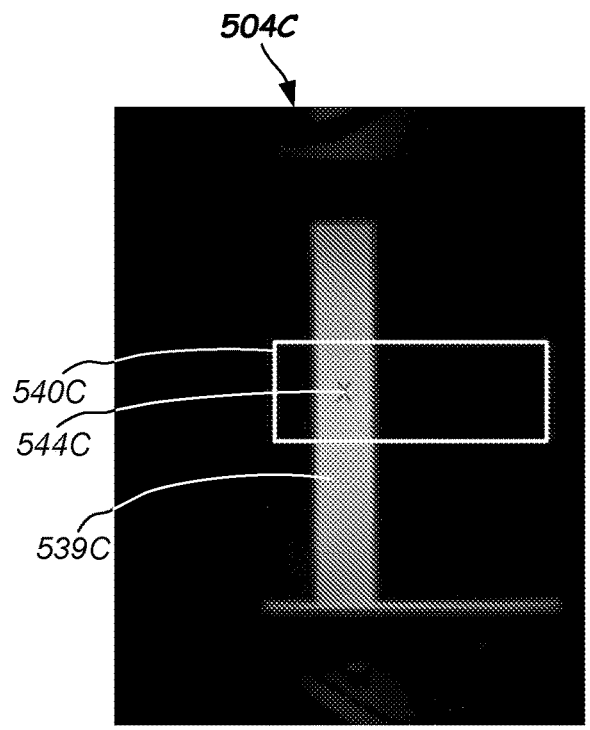
FIG. 5F illustrates a pixelated image taken by imaging device 106C including a masked region formed by an LCD mask on light panel 104C illustrating a second optical region (the unmasked region) of the image according to one or more embodiments.
Figure 5G:
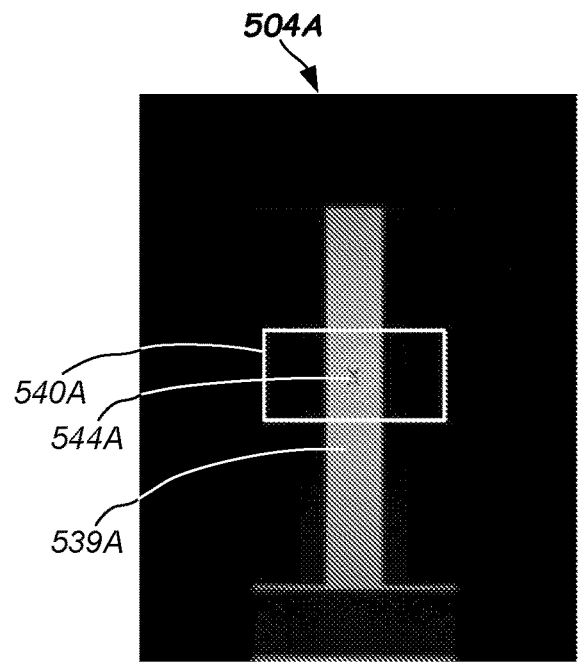
FIG. 5G illustrates a pixelated image taken by imaging device 106A including a masked region formed by an LCD mask on light source 104A (light panel) and illustrating a second optical region illustrating a second optical region (the unmasked region) of the image according to one or more embodiments.

As shown in FIGS. 5E-5G, the method 600 first defines the search windows 540A-540C (bounding boxes) according to the size (width) of the light sources 104A-104C as seen in FIGS. 5B-5D. Within the search window 540A-540C, the boundaries of the imaging areas 539A-539C can be easily located as shown in vertical lines extending vertically within the search windows 540A-540C, and the exact center position within the imaging area located in the search windows 540A-540C of each light source 104A-104C is depicted as a cross (X) 544A-544C can be derived accordingly. Assuming the imaging devices 106A-106C in the imaging apparatus 101 have been calibrated so we know the relative poses between any two imaging devices, we can use the triangulation algorithm to find the optimal optical center 525 in the 3D space.

Thus, in block 606, the optimal optical center 525 of the imaging apparatus 101 is determined using the center position 544A-544C of the LCD mask of each imaging device 104A-104C and the center of the sensors 106SA-106SC. Alternatively, for a setup without the use of an LCD mask layer, the optimal optical center 525 may be directly determined from the center positions 541A-541C of imaging area 538A-538C. The illuminated panel region and image center together determine the imaging area 538A-538C and thus the center positions 541A-541C of imaging area 538A-538C. The triangulation algorithm can then be applied to derive the optimal optical center 525 in the 3D space.

Mechanical Center Localization

While the optimal optical center 525 is the preferred location for placing the sample tube 102 for back illumination, it might not be physically feasible to place the sample tube 102 at that point due to mechanical limitations. Therefore, the goal for the mechanical center localization is to find the location in space along the track 108 where the sample tube 102 can be placed that is closest to the optimal optical center 525. To this end, the method can use a tube calibration tool 450 (FIGS. 4C-4D) installed in a carrier 122. Tube calibration tool 450 can comprise a tube-like member that can be received in a receptacle 422R in the carrier 122 in the mechanical position shown in FIG. 4C. Receptacle 422R in the carrier 122 can be formed by supports 422S. More or less supports may be used. Thus, in block 608, the tube calibration tool 450 is installed in the carrier 122 residing on the track 108.

Figures 4C, 4D:
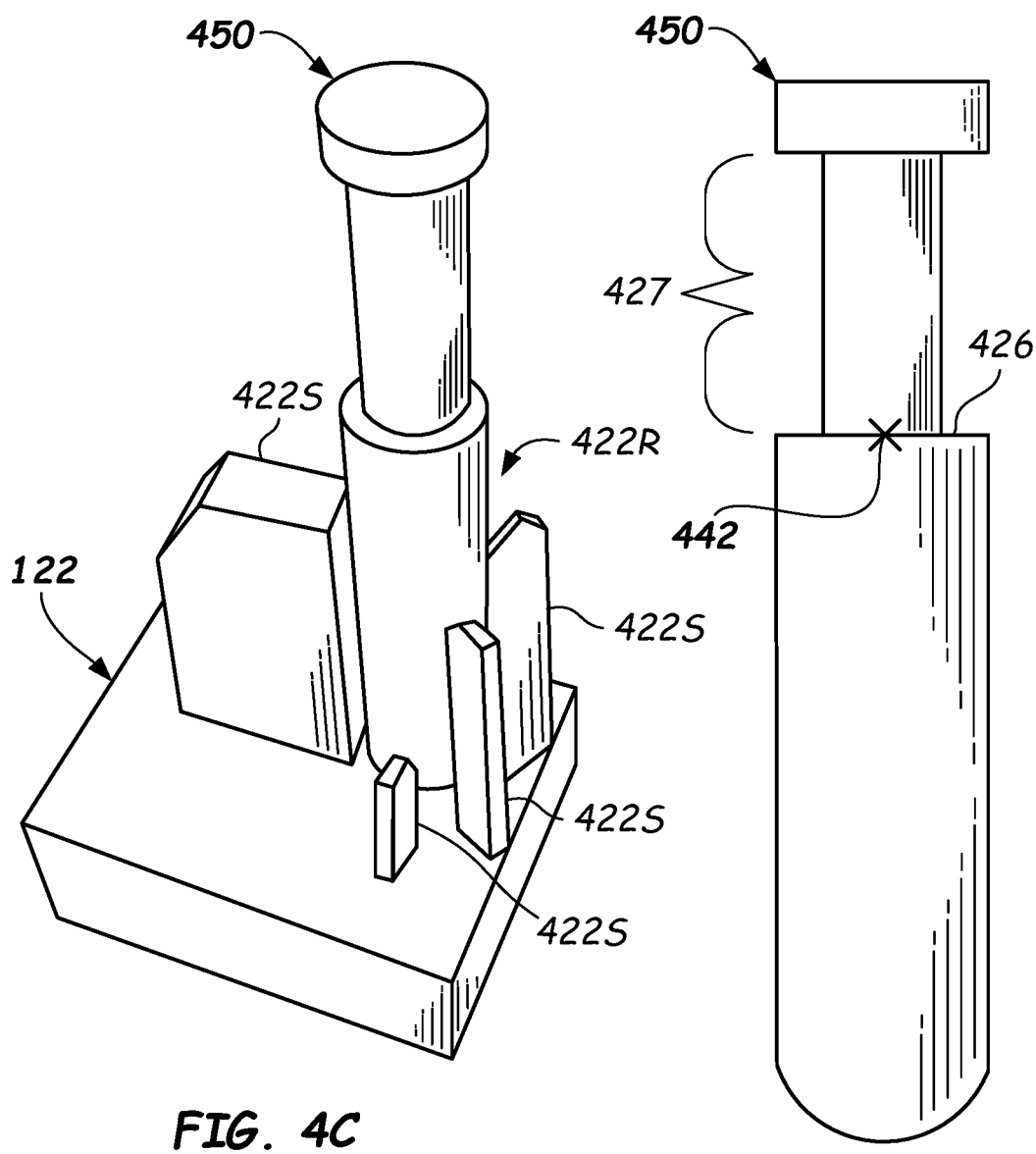
FIG. 4C illustrates a perspective view of a tube calibration tool mounted in another embodiment of a carrier according to one or more embodiments.
FIG. 4D illustrates a side view of the tube calibration tool of FIG. 4C including a stepped configuration according to one or more embodiments.

The tube calibration tool 450 is placed in the carrier 122 that moves along the track 108 by any suitable method and calibration according to the method 600 precisely calibrates the location of the center point 442 (physical 3D center on the centerline of the tube 102 for characterization thereof). The tube calibration tool 450 may be resident in a receptacle 422R of a carrier 122 similar to carrier shown in US Pat. Pub. 2018/0372648. Other suitable carriers may be used. The tube calibration tool 450 can include a step 426 as shown in FIG. 4D. This step 426 and a smaller dimensioned portion 427 may be used to locate the center point 442 of the tube calibration tool 450 relative to the image as shown in FIGS. 5H-5J. The center point 542A-542C for each viewpoint 1, 2, 3 is the intersection point of the plane of the step 426 and the lateral centerline of the smaller dimensioned portion 427.

By detecting the tool center 542A-542C from each viewpoint 1, 2, 3 in each image 504A'-504B' as shown in FIGS. 5H-5J via a center finding routine, the tool center point 542A-542C can be located, and the tool's 3D center point 442 can be determined with the triangulation algorithm. The method 600 then compares the current mechanical center location with the optimal optical center 525 and adjusts the position of the carrier 122 along the track 108 until the center point 542A-542C of the tube calibration tool 450 reaches the closest location to the optimal optical center 525. This may take several iterations. The center point 542A-542C of the tube calibration tool 450 at this final location will be taken as the mechanical center 535.

Once we've identified the mechanical center 535, we can back-project the center from each imaging device 104A-104C to its corresponding backlight panel 104A-104C to find the lighting center directly behind the sample tube 102 when we place the sample tube 102 at the mechanical center 535 and define a region of interest (ROI) 747 with a fixed size region accordingly.

Thus, in block 610, the carrier 122 is moved on the track 108 so that the center of the tube calibration tool 450 (e.g., center of smaller dimensioned portion 427) is located at a closest location to the optimal optical center 525 of the imaging apparatus 101, wherein the optimal optical center 525 is expressed by the rectangular box shown in FIGS. 5H-5J centered at the optimal optical center 525. Thus, the center point 442 of the tube calibration tool 450 is used to determine the center location of a region of interest (ROI) 747 (e.g., FIG. 7B) for backlight calibration in each viewpoint 1-3 for each imaging device 106A-106C. Thus, in block 616, a region of interest (ROI) 747 (e.g., FIG. 7B) for backlight calibration is determined. The ROI 747 can be chosen to be of a size associated with the area that will be characterized in the sample tube 102 or specimen 212. For example, the ROI 747 can be chosen to be of a size of the expected serum or plasma portion 212SP or slightly larger. Once the region of interest ROI 747 is chosen, then the ROI 747 can be calibrated in block 716. The above procedure can be repeated for all viewpoints 1-3 in block 616. One suitable calibration method 700 for calibrating a region of interest (ROI) identified in method 600 in a light panel 104A-104C is described below.

LED Adjustment

For the target applications of the device (e.g., imaging apparatus 101 of the quality check module 100), it is desirable for the panel illumination to be homogenous/even at a predefined illumination intensity. The illumination intensity of the panel mainly depends on the electrical drive current used to drive the respective LEDs, which may be included in LED strips. The drive current is known, but there are several unknown factors that also influence intensity, for example:

Individual LED efficiencies (radiant flux vs. electrical current)

Light coupling losses LED vs. light guide, e.g. mechanical tolerances and surface quality Tolerances in light guide material composition Due to these unknown factors, the electrical drive current cannot just be reproduced to achieve reproducible illumination intensity; instead, it is calibrated as described in the following calibration method 700 with reference to FIG. 7.

The illumination homogeneity in a region of interest (ROI) 747 of a light source (e.g., light source 104A, 104B, 104C) mainly depends on the distribution of illumination power over the a plurality of light elements 445 (e.g., which may be arranged as a strip of LEDs see FIGS. 4B and 7B) on the respective sides (e.g., first lateral side 746 and second lateral side 748) of the respective lighting source 104A-104C. Since the ROI 747 and therefore the distance from the plurality of light elements 445 (e.g., light strips) may vary depending on the mechanical center location calibration discussed above, the present calibration method 700 operates to adjust the drive current to the respective plurality of light elements 445 in two phases for those light panels (e.g. light sources 104A, 104B, 104C), while simultaneously observing the respective light source 104A, 104B, 104C with the opposing imaging devices 106A, 106B, 106C.

According to the method 700, in block 702, first the plurality of light elements 445 (e.g., which may be arranged in an LED strip) located on the first side (e.g., first lateral side 746), such as closer to the ROI 747, are turned on.

In block 704, the drive current Cs1 is then adjusted to the light elements 445 (e.g., LEDs) for the first side 746 until a representative intensity Ir (e.g., a first average intensity) at the ROI 747 reaches a first preset intensity value Ip1 (e.g., 100 digits in the digital image in a range of 0 to 256 digits grey level range). Next the method 700 keeps the drive current Cs1 flowing in line 450R to the light elements 445 of the first side 746 substantially at the preset intensity value Ip, and, in block 706, adjusts the drive current Cs2 in line 450L to light elements 445 (e.g., LEDs, which may be arranged in a strip or array) on the second side 748 until a representative intensity (e.g., average intensity) of the ROI 747 reaches to a second preset intensity value (e.g. 180 digits in the digital image in a range of from 0 to 256 grey level range).

Figure 7D:
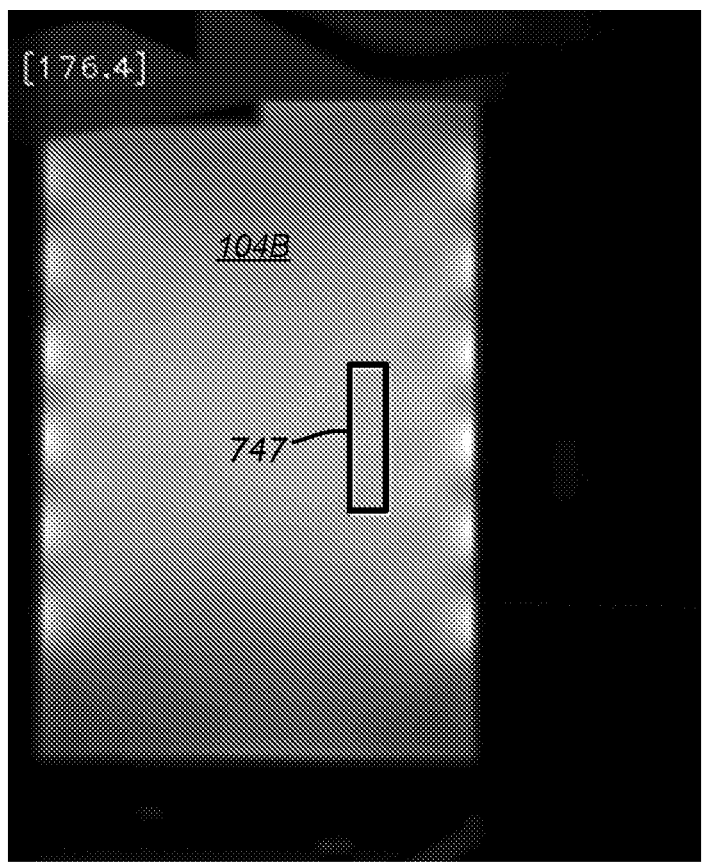
FIG. 7D illustrates front view pixelated image of the light panel 104B taken by imaging device 106B after the illumination of the multiple light elements on the first side and second side thereof according to one or more embodiments.

Pixelated images (photographs) of examples of light element (LED) adjustments are shown in first calibration of the plurality of light elements (LED strip) closer to the ROI 747 (see bounding box) until the average intensity reaches a first preset intensity level (e.g., 100 digits out of a range of 0 to 256 grey level range), then as shown in FIG. 7D, the drive current of the light elements (LED strip) far away from the ROI 747 is adjusted until the representative intensity Ir (e.g., average intensity) reaches the a second preset intensity value Ip2, which is the expected value sufficient for back illumination (e.g. 180 digits out of a range of 0 to 256 grey level range).

For a panel where the ROI center is located at almost equal distance from both sides (e.g., light source 104A), we set the same current to both sides 746, 748 of light elements 445 (LEDs) and adjust it until the average intensity of the ROI 747 reaches to the final preset value (e.g. 180 digits out of a range of 0 to 256 in the image). To speed up the current adjustment procedure, two or more preselected current settings can be saved in memory and then the corresponding intensities can be measured. With these values, the method 700 can approximate the current-intensity curve with either a first-order or a second-order equation for predicting what current can be applied in order to generate the target intensities. Accordingly, the final target intensity of the ROI 747 can usually be reached within a few iterations. This calibration method 700 can be carried out for each wavelength of interest, such as R, G, B, W, UV, IR and/or NIR, for example, for each light source 104A-104C.

Health Check

While we are using the central ROI 747 for calibrating the light elements 445 (e.g., LED strips), it may be desirable to verify the light distribution over the entire light source or representative portions thereof (e.g., light source 104A, 104B, 104C) to prevent or minimize inconsistent lighting within and across multiple sample quality check apparatus 100. Based on the location of the central ROI 747 with respect to the area of the entire light panel 104A-104C, multiple off-center regions can be chosen and then a representative intensity (e.g., average intensity) of the off center region (area) can be compared to the average intensity of the central ROI 747. The areas of the regions may be of any size, but may be the same size as the central ROI 747 in some embodiments.

Figure 8:
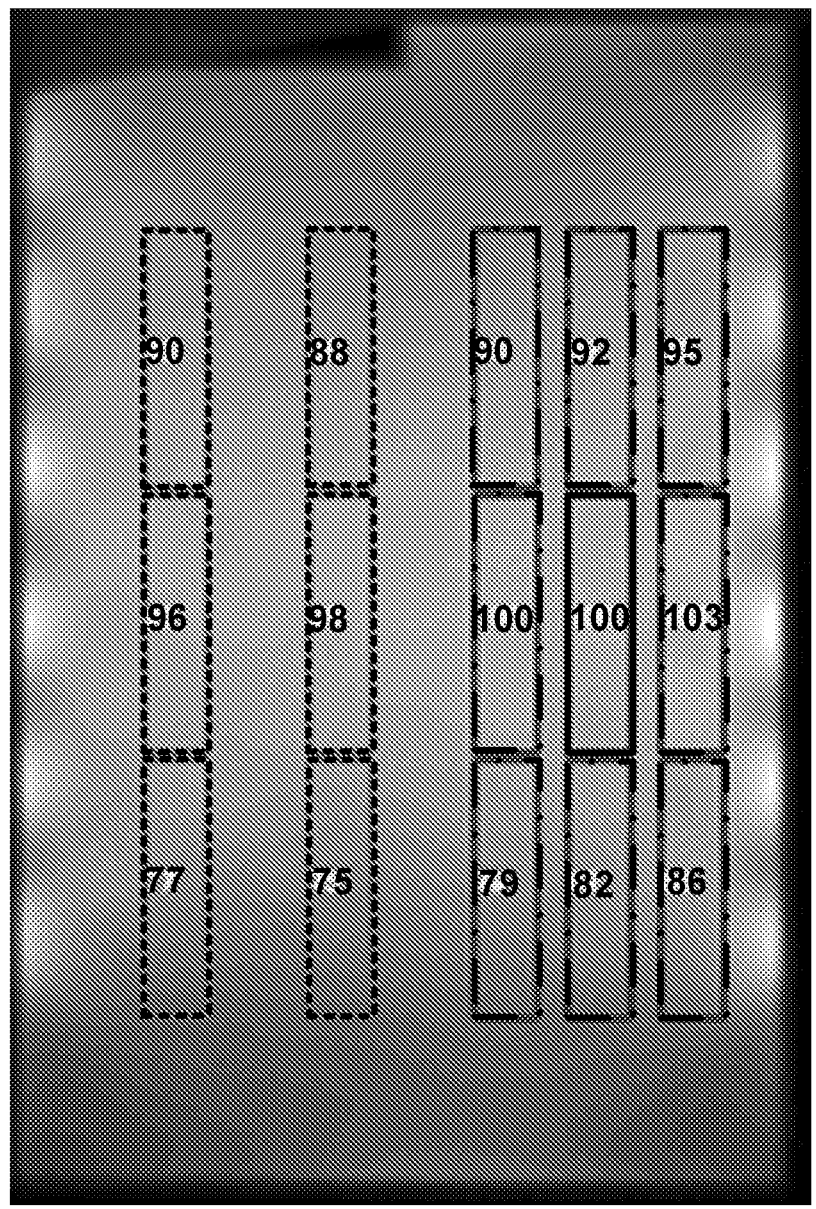
FIG. 8 illustrates a pixelated image of the locations of multiple off-center regions of interest (ROIs) (single dotted and dotted and dashed boxes) and a central ROI (solid box), wherein the number within each ROI is a ratio of its average intensity as compared to the average intensity of the central ROI represented as a percentage according to one or more embodiments.

FIG. 8 shows an example pixelated image of the regions (dotted and dotted and dashed boxes) and the average intensities of the other regions of the panel as compared to the central ROI (solid box) corresponding to the location of the central ROI 747 represented by a percentage. By establishing nominal intensity values for each region with either a reference sample quality check system or using the statistics from multiple good sample quality check systems, the consistency of any light panel can then be validated. This can be used to conduct an LED health check, which can be carried out periodically or any desired interval.

The calibration method 600 used to calibrate imaging apparatus 101 will now be described. Calibration method 600 comprises imaging that ideally takes place before pre-screening imaging measurements are actually taken by the imaging apparatus 101 of the quality check module 100. Thus, the calibration method 600 can be used for more than one pre-screening operation (e.g., pre-screening of multiple sample tubes 102) before a re-calibration is again performed. The calibration method 600 can be undertaken prior to pre-screening of any sample tubes 102, such as for the presence of an interferent, such as for HILN, an artifact such as a clot, foam, or bubbles, and the like. In some embodiments, a single calibration method 600 may be undertaken for a specific rack of sample tubes 102, for a lot of sample tubes 102, for a period of time such as a shift, a day, a week, or a month, or other time period, after a certain number of sample tubes 102 are pre-screened, or any other suitable calibration period or interval. Thus, the calibration method can be undertaken after a number of sample tubes are pre-screened or after a specific period of time after initiating pre-screening.

While the disclosure is susceptible to various modifications and alternative forms, specific system, apparatus, and method embodiments thereof have been shown by way of example in the drawings and are described in detail herein. It should be understood, however, that it is not intended to limit the disclosure to the particular system, apparatus or methods disclosed but, to the contrary, the intention is to cover all modifications, equivalents, and alternatives falling within the scope of the claims.

What is claimed is:

1. A calibration method, comprising:
identifying an imaging area on each of a plurality of light panels with respect to each of a respective plurality of imaging devices included in an imaging apparatus;
determining a center position of the imaging area of each light panel for each imaging device;
determining an optimal optical center of the imaging apparatus using the center position of each light panel for each imaging device;
installing a tube calibration tool in a carrier on a track;
moving the carrier on the track so that a center of the tube calibration tool is located at a closest location to the optimal optical center of the imaging apparatus; and
using the center of the tube calibration tool to determine a center of a region of interest for backlight calibration.

2. The calibration method of claim 1, where the center position is determined laterally by an image center and vertically by half the height of the illuminated area of the light panel.

3. The calibration method of claim 1, where the center position is determined by a center of a mask layer on each light panel.

4. The calibration method of claim 1, further comprising performing a background calibration of the region of interest.

5. The calibration method of claim 4, wherein one of the plurality of light panels has a plurality of light elements on a first side and a plurality of light elements on a second side, the method further comprising:
turning on a first drive current to the plurality of light elements on the first side of the one light panel, the first side adjacent to the region of interest;
adjusting the first drive current to the plurality of light elements of the one light panel on the first side until a representative intensity at the region of interest reaches a preset value; and
with the drive current still being driven to the plurality of light elements of the one light panel on the first side, adjusting the drive current to the plurality of light elements of the light panel on the second side until a representative intensity of the region of interest reaches a second preset intensity value.

6. The calibration method of claim 5, further comprising first turning on the first drive current to the plurality of light elements of the light panel on the first side that is closest to the region of interest.

7. The calibration method of claim 1, further comprising comparing an average intensity of at least one other region of the light panel to an average intensity of the second preset intensity value of the region of interest.

8. The calibration method of claim 7, wherein the comparing the average intensity comprises displaying a percentage of the average intensity value for each of the at least one other region to the average intensity of the second preset intensity value.

9. The calibration method of claim 1, further comprising comparing an average intensity value of another region of the light panel to an average intensity value of a comparable region from a reference sample quality check system.

10. The calibration method of claim 1, wherein the calibration method is undertaken prior to pre-screening of sample tubes for an interferent.

11. The calibration method of claim 1, wherein the calibration method is undertaken after a number of sample tubes are pre-screened or after a specific period of time after initiating prescreening.

12. The calibration method of claim 1, wherein the center position of each light panel is optically located by locating boundaries of central segments within respective search windows wherein the central segments are based on the intersection of the search windows with an unmasked region.

13. The calibration method of claim 1, wherein the plurality of light elements comprises red light elements, green light elements, and blue light elements.

14. The light panel calibration method of claim 13, wherein the plurality of light elements comprises white light elements.

15. A light panel calibration method, comprising:
turning on a first drive current to a plurality of light elements of a light panel on a first side of the light panel, the first side adjacent to a region of interest;
adjusting the first drive current to the plurality of light elements of the light panel on the first side until a representative intensity at the region of interest reaches a preset value; and
with the drive current still being driven to the plurality of light elements of the light panel on the first side, adjusting the drive current to a plurality of light elements of the light panel on a second side of the light panel until a representative intensity of the region of interest reaches a second preset Intensity value.

16. The light panel calibration method of claim 15, wherein the first side is a side closest to a region of interest.

17. The light panel calibration method of claim 15, wherein the plurality of light elements comprises red light elements.

18. The light panel calibration method of claim 15, wherein the plurality of light elements comprises green light elements.

19. The light panel calibration method of claim 15, wherein the plurality of light elements comprises blue light elements.

20. The light panel calibration method of claim 15, wherein the plurality of light elements comprises white light elements.

* * * * *